US012375878B2

(12) United States Patent
Kondrashov et al.

(10) Patent No.: US 12,375,878 B2
(45) Date of Patent: Jul. 29, 2025

(54) PRIVATE LOCATION VERIFICATION AND ENHANCEMENT

(71) Applicant: HERE Global B.V., Eindhoven (NL)

(72) Inventors: Oleksandr Kondrashov, Chicago, IL (US); Onur Derin, Eindhoven (NL); Giovanni Lanfranchi, Chicago, IL (US)

(73) Assignee: HERE Global B.V., Eindhoven (NL)

( * ) Notice: Subject to any disclaimer, the term of this patent is extended or adjusted under 35 U.S.C. 154(b) by 591 days.

(21) Appl. No.: 17/747,766

(22) Filed: May 18, 2022

(65) Prior Publication Data

US 2022/0377504 A1 Nov. 24, 2022

(30) Foreign Application Priority Data

May 19, 2021 (EP) .................................... 21174736

(51) Int. Cl.
*H04W 4/029* (2018.01)
*H04W 12/02* (2009.01)

(52) U.S. Cl.
CPC .......... *H04W 4/029* (2018.02); *H04W 12/02* (2013.01)

(58) Field of Classification Search
CPC .................................................... H04W 4/029
USPC ..................................................... 455/456.1
See application file for complete search history.

(56) References Cited

U.S. PATENT DOCUMENTS

| 9,158,925 | B2 | 10/2015 | Kamara |
| 9,736,128 | B2 | 8/2017 | Premnath et al. |
| 2017/0276762 | A1* | 9/2017 | Pama ................... H04W 88/08 |
| 2018/0152836 | A1* | 5/2018 | Milton ................ H04W 12/033 |
| 2020/0235911 | A1* | 7/2020 | Safak .................... H04L 9/3247 |

FOREIGN PATENT DOCUMENTS

CN       111984754 A       11/2020

OTHER PUBLICATIONS

Dupin, "Secure Multi-Party Computation and Privacy", Feb. 26, 2020, 167 pages.
Traore, "Safety Protocols to Establish Distances and Authenticate Position for Mobile Devices", Jul. 2015, 128 pages.
Kolesnikov et al., "Practical Multi-Party Private Set Intersection from Symmetric-Key Techniques", Aug. 24, 2017, 25 pages.
Choi et al., "Secure Multiparty Computation and Trusted Hardware: Examining Adoption Challenges and", Review Article, Security and Communication Networks, vol. 2019, 28 pages.
Office Action for related European Patent Application No. 21174736. 5-1213, dated Aug. 18, 2021, 8 pages.

* cited by examiner

*Primary Examiner* — Ahmad F. Matar
*Assistant Examiner* — Jirapon Tulop
(74) *Attorney, Agent, or Firm* — DITTHAVONG, STEINER & MLOTKOWSKI

(57) ABSTRACT

Methods and devices for privately verifying and enhancing location data are disclosed. A location-based services server receives a possible location of a mobile device. A location verification system determines a detected location of the mobile device. The location-based services server and location verification system communicate using a private set intersection technique to determine whether the possible location corresponds to the detected location without the possible location or detected location being shared. Probabilities associated with the possible and detected locations can also be combined to enhance the accuracy of the possible location.

20 Claims, 14 Drawing Sheets

PRIVATE LOCATION VERIFICATION AND ENHANCEMENT

RELATED APPLICATION

This application claims priority to European Patent Application No. EP21174736, filed May 19, 2021, entitled "PRIVATE LOCATION VERIFICATION AND ENHANCEMENT", which is incorporated herein by reference in its entirety.

BACKGROUND

The rise in the use of location-aware devices such as tablets and smartphones has resulted in a huge increase in the availability of location data. Location data can be useful when providing location-based services such as navigation services, social networking services, and location-based advertising. For example, location data associated with vehicles travelling along a section of road can be used to determine traffic levels and traffic flow rates, which can in turn be used to improve route planning algorithms.

However, location data must be accurate if it is to be useful. To determine its location, a location-aware device generally uses one or more of satellite-based positioning (such as GPS and GLONASS), cellular-based positioning, and Wi-Fi-based positioning. While the use of these technologies under ideal conditions allows for extremely accurate positioning, the determined location can sometimes be inaccurate or incorrect when conditions are suboptimal, for example when a GPS signal is blocked by a surrounding structure and/or when a Wi-Fi positioning database is out of date.

In addition, location data can easily be spoofed (i.e. a location that is different to the device's actual location can be reported), which leads to inaccurate data being collected for a location. Location spoofing is particularly prevalent in situations where users are rewarded for providing location data associated with a particular location, in which case it may be easier to spoof the location to obtain the reward instead of actually travelling to the location.

There is a need for methods that can verify the accuracy of location data collected by location-based services providers. However, data protection regulations often limit the extent to which location data can be shared, so location verification methods must respect user privacy and avoid sharing location data with third parties without the consent of the person from which it is collected.

SUMMARY OF THE INVENTION

According to a first aspect of the invention, there is provided a computer-implemented method for verifying a location of a mobile device comprising, at a location-based services (LBS) server: receiving, from the mobile device, a device identifier associated with the mobile device and location information indicating a possible location of the mobile device; determining a first set of LBS server tiles corresponding to a geographical area associated with the possible location of the mobile device; sending a location verification request to a location verification system, the location verification request comprising the device identifier and causing the location verification system to determine a detected location of the mobile device using network-based positioning; and, verifying the possible location by communicating with the location verification system using a private set intersection technique to determine whether at least one element of the first set of LBS server tiles is also an element of a first set of verification system tiles corresponding to a geographical area associated with the detected location of the mobile device, the first set of verification system tiles determined by the location verification system.

The method of the first aspect allows the possible location of a mobile device (particularly a non-static device such as a smartphone, tablet etc.) to be verified in a computationally efficient manner without the LBS server sharing the possible location with the location verification system. The method therefore allows for improvements in the reliability of location data collected by the LBS server whilst preserving user privacy. The location verification method could also be used in situations such as verifying cargo deliveries and verifying unbroken cold chains.

Optionally, verifying the possible location may comprise, at the LBS server: generating a second set of LBS server tiles by individually obfuscating and encrypting each element of the first set of LBS server tiles using a public key; sending the second set of LBS server tiles to the location verification system; receiving a third set of LBS server tiles and a second set of verification system tiles from the location verification system, wherein the third set of LBS server tiles corresponds to the second set of LBS server tiles in which each element has been individually encrypted using a private key associated with the public key, and wherein the second set of verification system tiles corresponds to the first set of verification system tiles in which each element has been individually encrypted using the private key; generating a fourth set of LBS server tiles by de-obfuscating each element of the third set of LBS server tiles; and, verifying whether the possible location corresponds to the detected location by determining whether at least one element of the fourth set of LBS server tiles is also an element of the second set of verification system tiles.

These steps for verifying the possible location correspond to the steps of an RSA-based private set intersection procedure that can be used to securely verify the possible location in a computationally efficient and privacy preserving manner.

The location information may comprise an uncertainty associated with the possible location, and the first set of LBS server tiles may be determined based on the uncertainty associated with the possible location.

One skilled in the art will recognise that there are several ways in which the LBS server tiles can be determined based on the uncertainty associated with the possible location. For example, the tiles may be those that intersect with the geographical region encompassed by the uncertainty, or a confidence threshold may be used to select all tiles within a predetermined confidence interval around a mean location.

The method may further comprise the LBS server: determining, based on the uncertainty associated with the possible location, a respective LBS server probability associated with each element of the first set of LBS server tiles; receiving, from the location verification system, a respective verification system probability associated with each element of the first set of verification system tiles; determining an intersection set of tiles common to the first set of LBS server tiles and the first set of verification system tiles; and, determining an updated probability associated with each element of the intersection set of tiles by combining and normalising the respective LBS server probability and verification system probability associated with each element of the intersection set of tiles.

In this way, the LBS server can obtain more accurate location information associated with the mobile device without sharing the possible location with the location verification system (and without the location verification system sharing the detected location with the LBS server). This allows for the location information to be enhanced in a privacy preserving manner.

The method may further comprise determining, at the LBS server, an updated location based on the updated probability associated with each element of the intersection set of tiles.

Determining an updated location may comprise: interpolating a continuous distribution based on the updated probability associated with each element of the intersection set of tiles; and, determining a mean of the continuous distribution, wherein the updated location is the mean of the continuous distribution.

Optionally, the method further comprises, at the LBS server: determining a proposed tile level based on the uncertainty associated with the possible location; sending the proposed tile level to the location verification system; and, receiving, from the location verification system, a confirmed tile level, wherein the first set of LBS server tiles is determined based on the confirmed tile level.

By agreeing a tile level with the location verification system, a balance can be achieved between the number of tiles in each set and the accuracy with which the location verification is performed. If the uncertainty is large, a lower tile level (corresponding to geographically larger tiles) may be used so that fewer tiles are required to cover the large area associated with the position, whereas if the uncertainty is small a high tile level (corresponding to geographically smaller tiles) can be used as relatively few tiles will be needed to represent the small area associated with the position. Adjusting the tile level allows for a balance between the size of the tile sets (and therefore the time it takes to perform the method and the memory and bandwidth consumed in storing and communicating the tile sets) and the accuracy with which the positions are represented, which is important given the large number of location reports received by LBS servers.

According to a second aspect of the invention, there is provided a computer-implemented method for verifying a location of a mobile device comprising, at a location verification system: receiving, from a location-based services (LBS) server, a location verification request comprising a device identifier associated with the mobile device; determining a detected location of the mobile device using network-based positioning; determining a first set of verification system tiles corresponding to a geographical location associated with the detected location of the mobile device; and, communicating with the LBS server using a private set intersection technique in order to determine whether at least one element of the first set of verification system tiles is also an element of a first set of LBS server tiles corresponding to a geographical area associated with a possible location of the mobile device known by the LBS server.

The method of the second aspect allows the possible location of a mobile device (particularly a non-static device such as a smartphone, tablet etc.) to be verified in a computationally efficient manner without the location verification system sharing the detected location with the LBS server.

Optionally, communicating with the LBS server using a private set intersection technique may comprise, at the location verification system: receiving, from the LBS server, a second set of LBS server tiles corresponding to the first set of LBS server tiles in which each element has been individually obfuscated and encrypted using a public key; generating a third set of LBS server tiles by individually encrypting each element of the second set of LBS server tiles using a private key associated with the public key; generating a second set of verification system tiles by individually encrypting each element of the first set of verification system tiles using the private key; and, sending the third set of LBS server tiles and the second set of verification system tiles to the LBS server for location verification by the LBS server.

These steps for communicating with the LBS server correspond to the steps of an RSA-based private set intersection procedure that can be used to securely verify the possible location in a computationally efficient and privacy preserving manner.

Determining the detected location of the mobile device may comprise determining an uncertainty associated with the detected location, wherein the first set of verification system tiles may be determined based on the uncertainty associated with the detected location.

One skilled in the art will recognise that there are several ways in which the verification system tiles can be determined based on the uncertainty associated with the detected location. For example, the tiles may be those that intersect with the geographical region encompassed by the uncertainty, or a confidence threshold may be used to select all tiles within a predetermined confidence interval around a mean location.

The method may further comprise, at the location verification system: determining, based on the uncertainty associated with the detected location, a respective verification system probability associated with each element of the first set of verification system tiles; and, sending, to the LBS server, the respective verification system probability associated with each element of the first set of verification system tiles.

This allows for location information associated with the mobile device to be enhanced in a privacy-preserving manner without sharing the detected location with the LBS server.

The method may further comprise, at the location verification system: receiving, from the LBS server, a first proposed tile level; determining a second proposed tile level based on the uncertainty associated with the detected location; determining a confirmed tile level; wherein the confirmed tile level is the maximum of the first proposed tile level and the second proposed tile level; and, sending the confirmed tile level to the LBS server, wherein the first set of verification system tiles is determined based on the confirmed tile level.

By agreeing a tile level with LBS server, a balance can be achieved between the number of tiles in each set and the accuracy with which the location verification is performed. If the uncertainty is large, a lower tile level (corresponding to geographically larger tiles) may be used so that fewer tiles are required to cover the large area associated with the position, whereas if the uncertainty is small a high tile level (corresponding to geographically smaller tiles) can be used as relatively few tiles will be needed to represent the small area associated with the position. Adjusting the tile level allows for a balance between the size of the tile sets (and therefore the time it takes to perform the method the memory and bandwidth consumed in storing and communicating the tile sets) and the accuracy with which the positions are represented, which is important given the large number of location verification requests that may be received by the location verification system.

Optionally, the location verification system may be a mobile network operator (MNO) providing mobile network services to the mobile device. The MNO may use a cellular-based positioning technique (e.g. based on 5G) to determine a detected location of the mobile device.

The tiles may be two-dimensional map tiles or three-dimensional blocks or map tiles.

The private set intersection technique may be an RSA-based private set intersection technique.

According to a third aspect of the invention, there is provided an apparatus comprising a processor configured to perform the method of the first or second aspects.

According to a fourth aspect of the invention, there is provided a computer program product comprising instructions which, when executed by a processor, cause the processor to perform the method of the first or second aspects.

BRIEF DESCRIPTION OF THE DRAWINGS

An example of the present invention will now be described in detail with reference to the accompanying drawings, in which.

DETAILED DESCRIPTION

Location data is at the centre of business value creation in many industries. Location data can be sourced in a business-to-business or business-to-customer fashion from various sources to implement location-based services (LBS). The cost of sourced data depends on various factors such as its volume, quality/accuracy and coverage. In the case of crowdsourcing, some form of monetary compensation may be given for data collection.

It is well-known to use cellular mobile radio technologies to determine the position of mobile devices such as smartphones. Different technologies can employ techniques such as angle of arrival (AoA), time of arrival (ToA) and time difference of arrival (TDoA) to achieve different key performance indicators such as latency, accuracy and cost. A survey of cellular positioning techniques is given in Peral-Rosado et al. "Survey of Cellular Mobile Radio Localization Methods: From 1G to 5G".

The advances in mobile communication technologies, such as 5G, enable positioning of a mobile device with much higher accuracy than was possible with previous generation standards. 5G cellular networks are expected to facilitate low-cost, high-accuracy positioning due to the use of massive MIMO, network densification, beamforming, and device-to-device networking. Unlike in earlier cellular network technologies, positioning is built into the 5G standardisation process.

This provides both opportunities and challenges for making use of 5G positioning capabilities for mobile network operators (MNOs) and location-based businesses. The improved capability of MNOs to position a subscribed mobile device with certain quality metrics leads to privacy concerns, and any business solution that leverages 5G positioning capabilities and involves sharing of location data needs to maintain the privacy and security of user information.

One of the potential collaboration opportunities between LBS providers and MNOs is proof-of-location. MNOs with 5G positioning capabilities can act as location verifiers when the quality and authenticity of location data is critical for a business.

However, the sharing of location data needs to respect user privacy and legal regulations. The naïve solution in which a third party can obtain the location of a mobile device from an MNO does not respect privacy, so alternative privacy-preserving solutions are needed.

Location Verification Method

Figure 1:
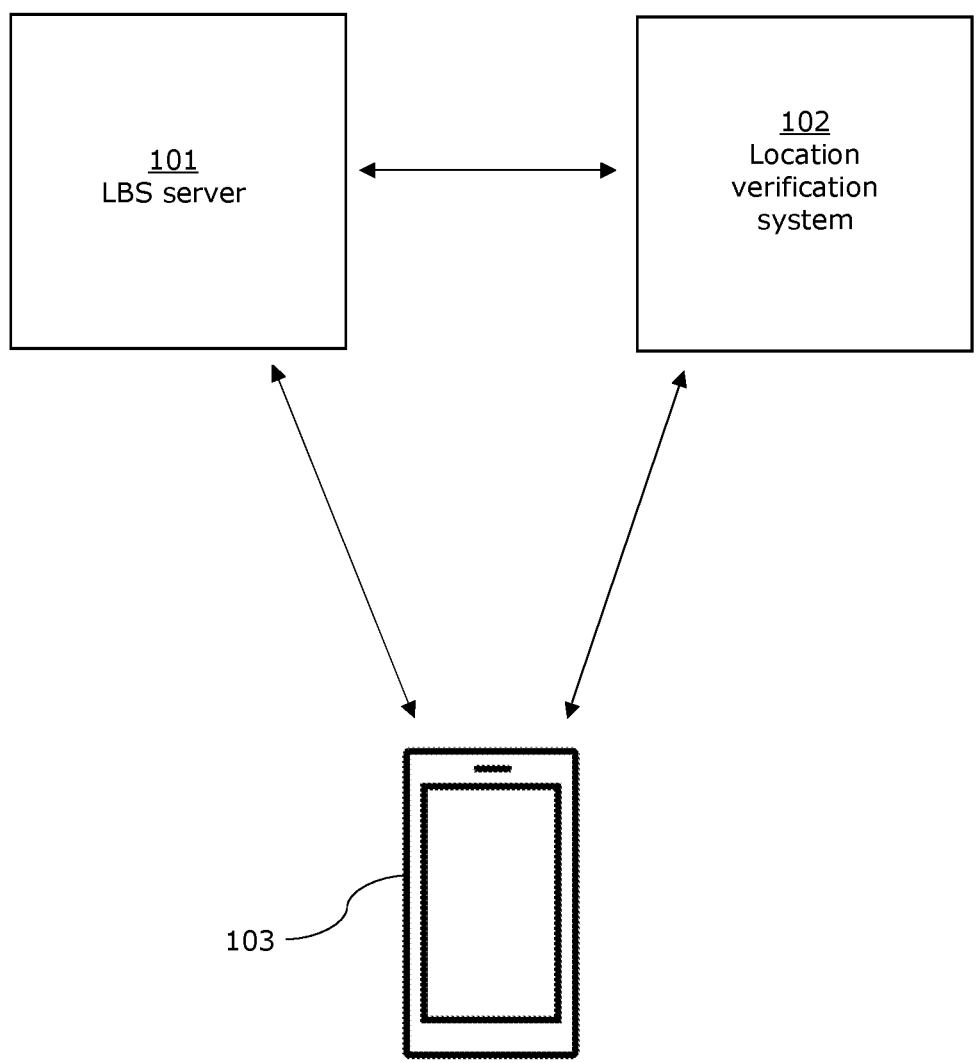
FIG. 1 shows a schematic representation of a system for performing a location verification method.

FIG. 1 shows a schematic representation of a system 100 for performing location verification in a privacy-preserving manner. The system 100 has an LBS server 101 (operated by an LBS provider) and a location verification system 102 in communication with one another via a communication channel such as the Internet. The LBS server 102 is also in communication with a mobile device 103 via a communications channel such as the Internet.

The LBS server 101 may be any virtual or physical server that provides location-based services, such as services relating to mapping. For example, the LBS server 101 may be a physical computing/processing device having, among other components, a processor, a memory and a communications interface. Alternatively, the LBS server 101 may be a cloud-based server and/or may be distributed across multiple physical computing systems or nodes. The LBS server 101 may also be referred to as a device positioning proxy.

The LBS server 101 is not part of an MNO system, and it is not capable of directly determining the location of a mobile device using network-based positioning techniques. In the present disclosure, network-based (or station- or access point-based) positioning means techniques that determine the position of a mobile device using e.g. triangulation or similar of wireless signals (i.e. techniques that are based on signal readings taken by a base station or access point etc. and do not rely on a potentially untrustworthy mobile device reporting its location or reporting signals received/detected by a mobile device at a location). A preferred example of network-based positioning employed by the methods disclosed herein is radiolocation, particularly passive radiolocation (in which signals emitted/broadcast by the mobile device are detected). Other preferred examples of network-based positioning employed by the methods disclosed herein are network-based mobile phone tracking and Wi-Fi positioning, although any other suitable method such as Bluetooth or ultra-wideband (UWB) positioning may also be used (it should be noted that these techniques are sometimes used in combination with non-network-based positioning methods that use signal readings made at the mobile device).

The location verification system 102 is any virtual or physical system capable of determining a detected location of the mobile device 103 independently of the LBS server 101. For example, the verification system 102 may be a physical computing/processing device having, among other components, a processor, a memory and a communications interface. Alternatively, the LBS verification system 102 may be a cloud-based system and/or may be distributed across multiple physical computing systems or nodes.

In a particular configuration, the location verification system 102 is an MNO system providing mobile network services (also referred to as cellular network services or cellular services) to the mobile device 103, e.g. voice and data services. For example, the mobile network services may be 5G services or any other generation of mobile telecommunications technology (such as 1G, 2G, 3G, 4G, 6G, LTE etc.).

When the location verification system 102 is an MNO system, the MNO system may use network-based positioning methods based on AoA, ToA, TDoA etc. so that the detected location cannot be spoofed by the mobile device 103. As one skilled in the art will appreciate, the detected location could also be determined by other known network-based positioning methods such as Wi-Fi positioning, Bluetooth positioning, ultra-wideband (UWB) positioning etc when the location verification system 102 is not an MNO system.

The mobile device 103 may be referred to as an end user device, a user equipment or communication device. The mobile device 103 has, among other components, a processor, a memory and a communication interface. The mobile device 103 may be a smartphone, a tablet computer, a laptop/notebook computer, a wearable (e.g. a smartwatch) etc.

The mobile device 103 is a location aware device, i.e. it is capable of determining its geographical location in two or three dimensions. The mobile device 103 advantageously determines its position using on-device (i.e. handset-based) positioning techniques such as GNSS satellite-based positioning (e.g. GPS or GLONASS etc.), Wi-Fi-based positioning and/or cellular-based positioning. Alternatively, the location may be determined via a third party, for example it may be reported to the mobile device 103 by the location verification system 102, which can determine a detected location of the mobile device 103 using network-based positioning techniques as outlined above. The determined location will generally have an associated uncertainty reflecting the accuracy with which the location has been determined, and different positioning methods may be combined to improve accuracy with which the location is determined.

The mobile device 103 may report its location to the LBS server 101 in order to use LBS services provided by the LBS provider, such as navigation services. In addition, the LBS provider may reward the user for providing location data. For example, the location data shared by the mobile device 103 may help the LBS provider to improve its services, for example by providing traffic data. In order to incentivise the user to share location data, the LBS provider may offer a reward to the user in the form of financial compensation or similar.

In order to ensure that the location data provided by the mobile device 103 is accurate, the LBS provider needs to be able to verify the location. The location data provided by the mobile device 103 may be inaccurate if the user spoofs their location (e.g. to try and collect the reward) or if the location determined by the mobile device 103 is incorrect (e.g. due to outdated GPS positioning information or similar).

Figure 2A:
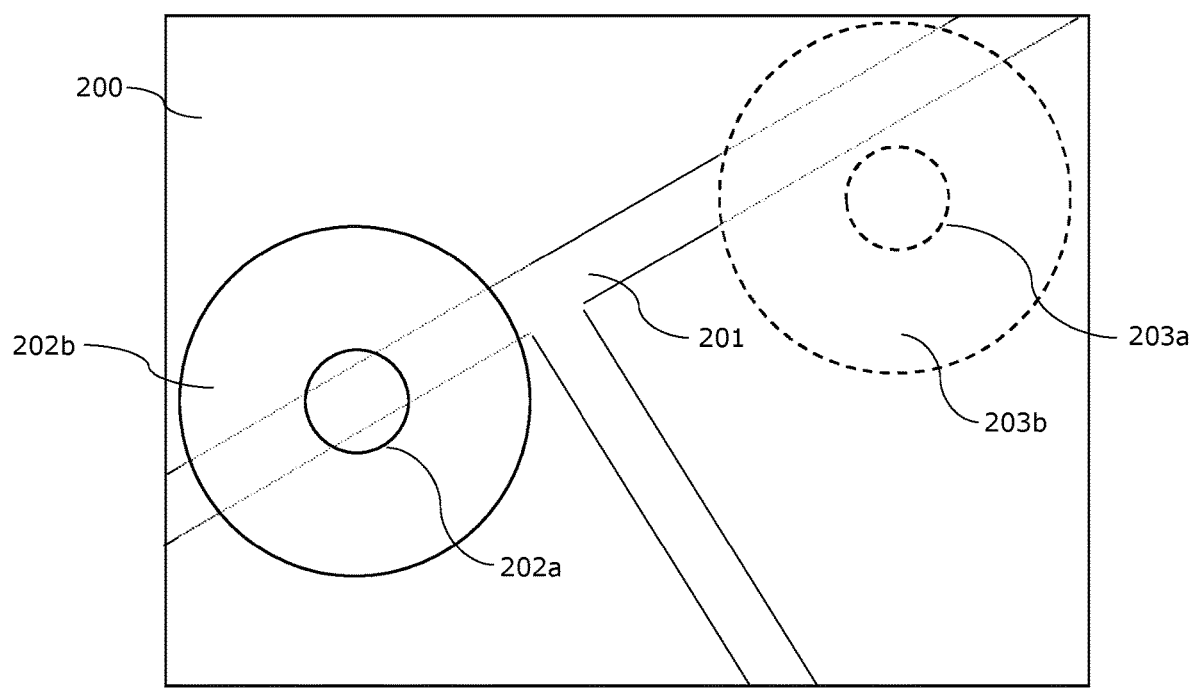
FIGS. 2a and 2b represent examples of possible and determined locations associated with a mobile device.
Figure 2B:
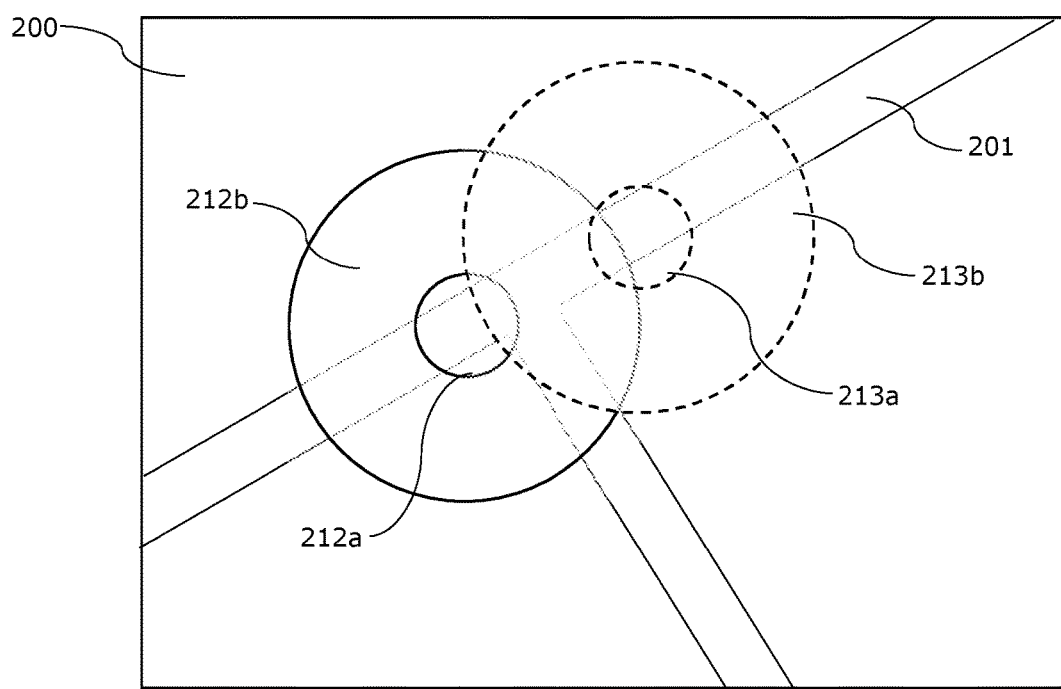

FIGS. 2a and 2b show examples of possible and detected locations associated with a mobile device 103 in a map region 200 that has a road 201.

FIG. 2a represents an example in which the possible and detected locations are different. The possible location reported by the mobile device 103 to the LBS server 101 is represented by the circle 202a. The surrounding circle 202b represents the uncertainty associated with the possible location 202a, e.g. due to the limitations of the positioning technology used by the mobile device 103. The detected location determined by the location verification system 102 is represented by the dashed circle 203a, with the surrounding dashed circle 203b representing the uncertainty associated with the detected location 203a.

FIG. 2b represents an example in which a possible location 212a and detected location 213a are approximately the same. Although the possible location 212a and detected location 213a do not exactly coincide, the respective uncertainties 212b and 213b associated with the possible location 212a and the detected location 213a overlap, indicating that the locations coincide when taking account of the uncertainty associated with both locations.

As the location verification system 102 is capable of independently determining a location of the mobile device 103, the LBS server 101 could in theory communicate with the location verification system 102 to confirm that the location reported by the mobile device 103 (the possible location) is the same as the location determined by the location verification system 102 (the detected location).

However, privacy requirements may mean that the LBS server 101 and location verification system 102 are forbidden from sharing location data with each other. This means that the LBS server 101 and location verification system 102 cannot share location data in order to verify whether the possible location corresponds to the detected location. While the LBS server 101 and location verification system 102 could compare encrypted or hashed location information, the uncertainty associated with the possible and detected locations means that the possible and detected location may not exactly match even when the possible location is correct (i.e. has not been spoofed and is not inaccurate), in which case the comparison would fail.

In order to solve the problem of how to verify the possible location of the mobile device 103 without sharing unencrypted location information between the LBS server 101 and the location verification system 102, the LBS server 101 and location verification system 102 can instead determine respective sets of tiles associated with the possible and actual locations and use a private set intersection technique to determine whether their respective tile sets have any common (intersecting) elements.

Figure 3A:
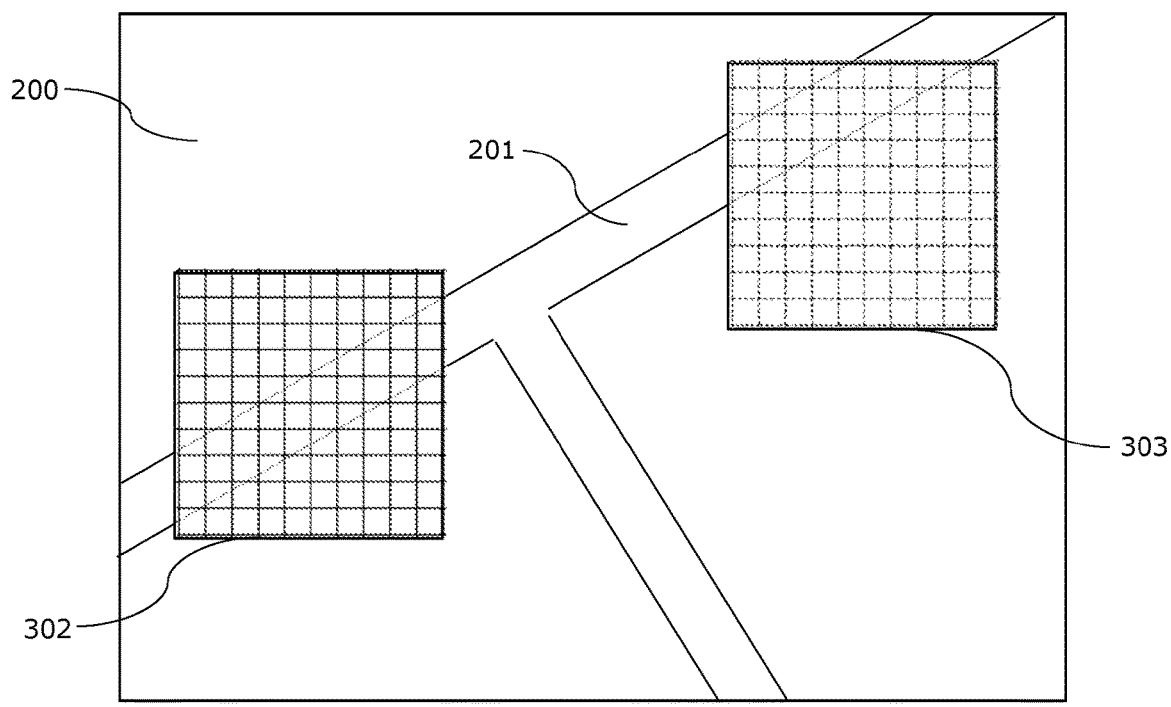
FIGS. 3a and 3b represents sets of tiles associated with the locations shown in FIGS. 2a and 2b respectively.
Figure 3B:
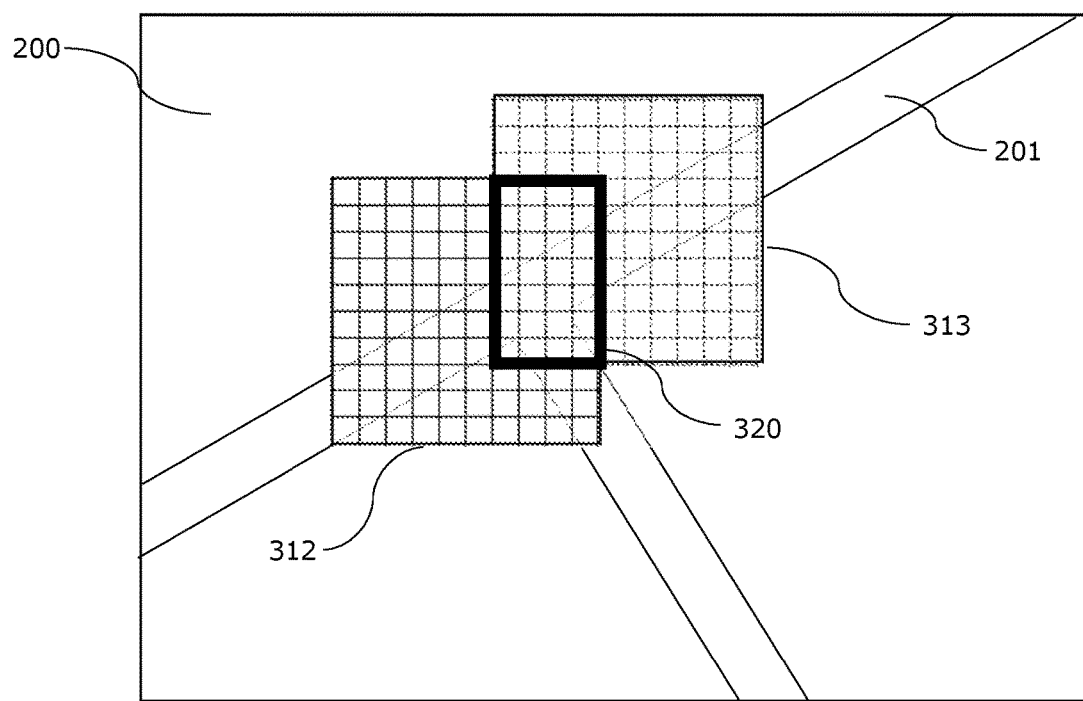

Example sets of tiles are shown in FIGS. 3a and 3b, which show the same map region 200 and road 201 as FIGS. 2a and 2b.

The set of tiles 302 in FIG. 3a is generated based on the possible location 202a in FIG. 2a, and the set of tiles 303 in FIG. 3a is generated based on the detected location 203a in FIG. 2a. Similarly, the set of tiles 312 in FIG. 3b is generated based on the possible location 212a in FIG. 2b, and the set of tiles 313 in FIG. 3b is generated based on the detected location 213a in FIG. 2b.

Various methods can be used for generating the sets of tiles (the tiles may also be referred to as map tiles). Each tile has an associated tile identifier/label/reference (such as a number or character string) which is used to identify that tile (i.e. each set of tiles is a set containing the tile identifiers associated with the relevant tiles).

The tiles represent geographical regions and may be two or three dimensional. While the term 'tile' is used generally to refer to both two and three dimensional geographical regions, the term 'block' or 'map block' may also be used, especially when referring to three dimensional regions. The tiles may have any tessellating shapes. Regular tiling arrangements such as square (or nearly square to accommodate projections) or hexagonal lattices are preferred in two dimensions, although any other tessellating arrangements (including random tessellations) can be used provided that the LBS server 101 and location verification system 102 agree on the tiling scheme. Likewise, regular tiling arrangements such as cubes, rhombic dodecahedrons or similar are preferred in three dimensions, but other tessellating shapes (regular or irregular) can also be used.

Exemplary tiling schemes include the HERE Map Tile API (which uses map tiles to form a complete map of the world using the Mercator Projection), OpenStreetMap tiles, and Uber H3 (which uses hexagonal, hierarchical indices). However, the method can be performed with any method that decomposes two- or three-dimensional space and assigns a unique identifier to each division.

In general, the number of and arrangement of tiles selected for a position will be determined by the uncertainty associated with that position. A greater uncertainty will mean the tiles cover a larger area, whereas a smaller uncertainty will mean the tiles cover a smaller area. In addition, the tile level/tiling level (i.e. the geographical size of each tile) may be adjusted based on the uncertainty to limit the number of tiles. For example, if the uncertainty is large, a lower tile level (corresponding to geographically larger tiles) may be used so that fewer tiles are required to cover the large area associated with the position, whereas if the uncertainty is small a high tile level (corresponding to geographically smaller tiles) can be used as relatively few tiles will be needed to represent the small area associated with the position. Adjusting the tile level allows for a balance between the size of the tile sets (and therefore the memory and bandwidth consumed in storing and communicating the tile sets) and the accuracy with which the positions are represented, which is important given the large number of location reports received by LBS servers (an LBS provider may receive location information from many thousands of mobile devices 103, each of which may report its location multiple times per day).

While the illustrated tile sets 302, 303, 312 and 313 are square arrays of square tiles and each array has the same size, actual tile sets may have different shapes (for example, the total area covered by the tiles is not necessarily square—it is more likely to have a jagged elliptical shape in real-word situations) and each set may contain a different number of tiles.

When verifying a possible location, the LBS server 101 determines a set of LBS server tiles (e.g. the sets of tiles 302 or 312) corresponding to the geographical area associated with the possible location provided by the mobile device 103, and the location verification system 102 independently determines a detected location of the mobile device 103 and determines a set of verification system tiles (e.g. the sets of tiles 303 or 313) corresponding to the geographical area associated with the detected location of the mobile device 103.

Having determined their respective tile sets (which should be generated using the same tiling scheme and tiling level), the LBS server 101 and location verification system 102 can use a private set intersection (PSI) technique to determine which (if any) tiles are common to both sets. For example, in the scenario depicted in FIG. 3a, there are no tiles common to tile sets 302 and 303, so the LBS server 101 would conclude that the possible location 202a provided by the mobile device 103 is not accurate/correct. However, in the scenario in FIG. 3b, there is an intersection set of tiles 320 containing tiles that are common to the set of LBS server tiles 312 and the set of verification system tiles 313, so the LBS server 101 would conclude that the possible location 212a provided by the user is accurate.

Figure 4:
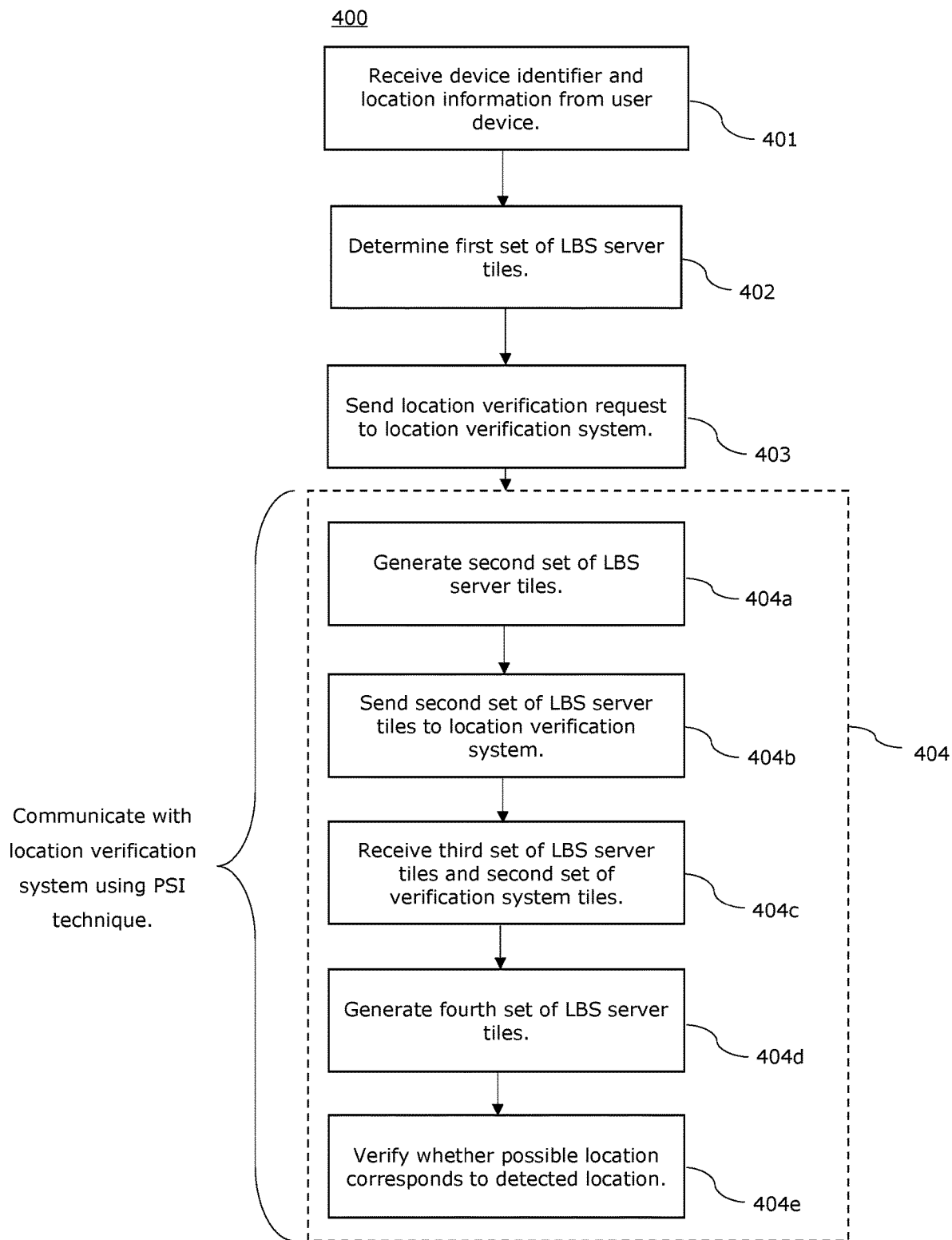
FIG. 4 illustrates a location verification method performed by a location-based services (LBS) server.

As mentioned above, when determining tiles that are common to the set of LBS server tiles and the set of verification system tiles, the LBS server 101 and location verification system 102 use a private set intersection technique. An example of a suitable private set intersection technique is disclosed in section 5.6 and FIG. 4 of De Cristofaro and Tsudik *"Practical Private Set Intersection Protocols with Linear Complexity"*, which are hereby incorporated by reference along with the associated definitions from Table 1. Referring to FIG. 4 of De Cristofaro and Tsudik, the client is the LBS server 101 and the server is the location verification system. The client's input is the set of LBS server tiles, and the server's input is the set of verification system tiles. The server also possesses an RSA private key d, and the server and client share a corresponding RSA public key (n, e).

Communicating using such a private set intersection protocol means that the LBS server 101 can determine which elements of the LBS server tiles are also elements of the verification system tiles without either party gaining any knowledge they did not already have. In particular, the LBS server 101 can only confirm what it already knows: if the possible location is incorrect, the LBS server 101 does not learn anything about the location of the mobile device 103 as detected by the location verification system 102. Likewise, the location verification system 102 does not learn anything about the possible location of the mobile device 103 known by the LBS server 101.

The method steps performed by the LBS server 101 are illustrated in FIG. 4. The method 400 begins in step 401 with the LBS server 101 receiving a device identifier and location information from the mobile device 103. The device identifier can be any identifier that is unique to the mobile device 103 and allows the mobile device 103 to be identified by the LBS server 101 and the location verification system 102. For example, the device identifier could be a MAC address, an IP address, a phone number, mobile identification number (MIN), mobile subscriber identification number (MSIN), IMEI etc. Prior to receiving the device identifier in step 401, the mobile device 103 may optionally register with the LBS provider, for example through an application or via a website of the LBS provider. The device identifier may be generated by, or sent to, the LBS server 101 as part of the registration process.

The location information includes a possible location of the mobile device 103, i.e. the location that the mobile device 103 reports to the LBS server 101. When the mobile device 103 is operating normally, the possible location will generally correspond to an approximate actual location of the mobile device 103 as determined using a positioning system of the mobile device 103. However, if an accurate location cannot be determined or the location is being spoofed, the possible location may significantly differ from the actual location of the mobile device 103. The location information may also include an uncertainty associated with the possible location. This uncertainty may be in the form of a precision associated with the possible location, or it may be probability distribution function in two- or three-dimensional space that represents the probabilistic result of the positioning technique used to determine the possible location.

At step 402, the LBS server 102 determines a first set of LBS server tiles, such as the tile sets 302 or 312 in FIGS. 3a and 3b respectively. The first set of LBS server tiles corresponds to a geographical area associated with the possible location (e.g. locations 202a and 212a in FIGS. 2a and 2b respectively). That is, the tiles are map tiles representing the geographical area surrounding the possible location. The first set of LBS server tiles may optionally be determined based upon the uncertainty associated with the possible position, e.g. based on a probability distribution function or other uncertainty associated with the possible position. The actual size and shape of the area covered by the tiles (and therefore the number of tiles in the first set of LBS server tiles) will vary depending upon the uncertainty and/or factors such as a predetermined maximum tile area etc.

The tile parameters, such as the tiling scheme to be used and the tile level (tile size), may be preconfigured to ensure that the LBS server 101 and location verification system 102 generate tiles using the same tile parameters. Alternatively, one or more of the parameters may be agreed or negotiated between the LBS server 101 and the location verification system 102 as part of the location verification process, e.g. the tile parameters may be dynamic and be adjusted each time a location is verified.

In particular, when determining the first set of LBS server tiles, the LBS server 101 may communicate with the location verification system 102 to agree a tile size to be used, whereby the tile size may be based on uncertainty associated with the possible location reported to the LBS server 101 by the mobile device 103 and/or an uncertainty associated with a detected location determined by the location verification system 102. As mentioned earlier, this has the advantage of reducing bandwidth requirements by allowing for a balance between the size of the tile sets and the accuracy with which the positions are represented. Prior to determining the first set of LBS server tiles, the LBS server 101 may determine a proposed tile level based on the uncertainty associated with the possible location. The LBS server 101 can then send the proposed tile level to the location verification system 102, which responds with a confirmed tile level. The first set of LBS server tiles 101 is then determined using the confirmed tile level (i.e. the tile level of the first set of LBS server tiles is set to the confirmed tile level). As discussed below, the confirmed tile may be determined by the location verification system 102 based on the uncertainty associated with the detected location determined by the location verification system 102.

At step 403, the LBS server 101 sends a location verification request to the location verification system 102. The location verification request may optionally be sent before the first set of LBS server tiles is determined, i.e. step 403 may be performed before step 402. The location verification request includes the device identifier associated with the mobile device 103 (so that the location verification system 102 can identify the mobile device 103) and causes the location verification system 102 to determine the detected location of the mobile device 103 using one of the network-based positioning techniques discussed above. The LBS server 101 does not share the possible location with the location verification system 102, and the location verification system 102 does not share the detected location with the LBS server 101.

Once the location verification system 102 has determined the detected location of the mobile device 103 (and, if necessary, agreed a tile level and/or other tile parameters with the LBS server 101), the location verification system 102 determines a first set of verification system tiles associated with a geographical area corresponding to the detected location of the mobile device 103 (e.g. the tile sets 303 or 313 in FIGS. 3a and 3b respectively associated with the detected locations 203a and 213a in FIGS. 2a and 2b).

At step 404, the LBS server 101 verifies the possible location by communicating with the location verification system 102 using a private set intersection technique to determine whether any elements of the first set of LBS server tiles are also elements of the first set of verification system tiles. The use of a private set intersection technique means that the possible location can be verified without the LBS server 101 or the location verification system 102 sharing any location information that is not already known by the other party.

Steps 404a-404e illustrate the steps of a possible private set intersection technique that can be employed in the method 400 using the RSA-based private set intersection protocol in FIG. 4 of De Cristofaro and Tsudik "*Practical Private Set Intersection Protocols with Linear Complexity*". Following the convention used in De Cristofaro and Tsudik, n is an RSA modulus, e is an RSA public exponent, d is an RSA private exponent, H( ) is a full-domain hash function and H'( ) is a regular cryptographic hash function.

At step 404a, the LBS server 101 generates a second set of LBS server tiles by individually obfuscating and encrypting each element of the first set of server tiles using a public key known to the LBS sever 101 and the location verification system 102. For example, given a first set of LBS server tiles $\{c_1, \ldots, c_v\}$, the LBS server 101 may generate the second set of LBS server tiles as $\{y_1, \ldots, y_v\}$, where $y_i = H(c_i) \cdot (R_{c:i})^e \bmod n$ and $R_{c:i}$ is a random variable generated by LBS server 101 associated with the i-th element of the first set of LBS server tiles. Prior to generating the second set of LBS server tiles, the LBS server 101 may communicate with the location verification system 102 to obtain the public RSA key (n, e) associated with the private key d generated by the verification system 102 (the private key d is known only by the location verification system 102).

At step 404b, the second set of LBS server tiles is sent from the LBS server 101 to the location verification system 102, e.g. via the Internet or otherwise.

At step 404c, the LBS server 101 receives a third set of LBS server tiles, and a second set of verification system tiles, both from the location verification system 102.

The third set of LBS server tiles corresponds to the second set of LBS server tiles in which each element of the second set of LBS server tiles has been individually encrypted by the location verification system 102 using the private key d known only to the location verification system 102. In particular, given the second set of LBS server tiles $\{y_1, \ldots, y_v\}$, the third set of LBS server tiles is $\{y'_1, \ldots, y'_v\}$ where $y'_i=(y_i)^d \bmod n$.

The second set of verification system tiles likewise corresponds to the first set of verification system times in which each element of the first set of verification system tiles has been individually encrypted using the private key d. In particular, given a first set of verification system tiles $\{s_1, \ldots, s_w\}$, the second set of verification system tiles is $\{t_1, \ldots, t_w\}$, where $t_i=H'((H(s_i))^d \bmod n)$.

At step 404d, the LBS server 101 generates a fourth set of LBS server tiles $\{t'_1, \ldots, t'_w\}$ by de-obfuscating each element of the third set of LBS server tiles, where $t'_i=H'(y'_i/R_{c:i})$.

At step 404e, the LBS server 101 compares the fourth set of LBS server tiles and the second set of verification system tiles to determine whether at least one element of the fourth set of LBS server tiles is also an element of the second set of verification system tiles (e.g. by determining an intersection set of tiles containing all (if any) elements of the fourth set of LBS server tiles that are also elements of the second set of verification system tiles). If there is at least one common tile, the possible location is determined to correspond to the detected location, i.e. the possible location is verified as being correct. If there are no common tiles (i.e. the intersection set of tiles is empty) then the possible location does not correspond to the detected location, and the possible location is not verified as being correct. The act of determining the intersection set of tiles implicitly determines whether there are any common tiles.

While the RSA-based private set intersection protocol is a preferred private set intersection technique for verifying the location due to the high level of security it provides, alternative private set intersection protocols could be used instead.

Figure 5:
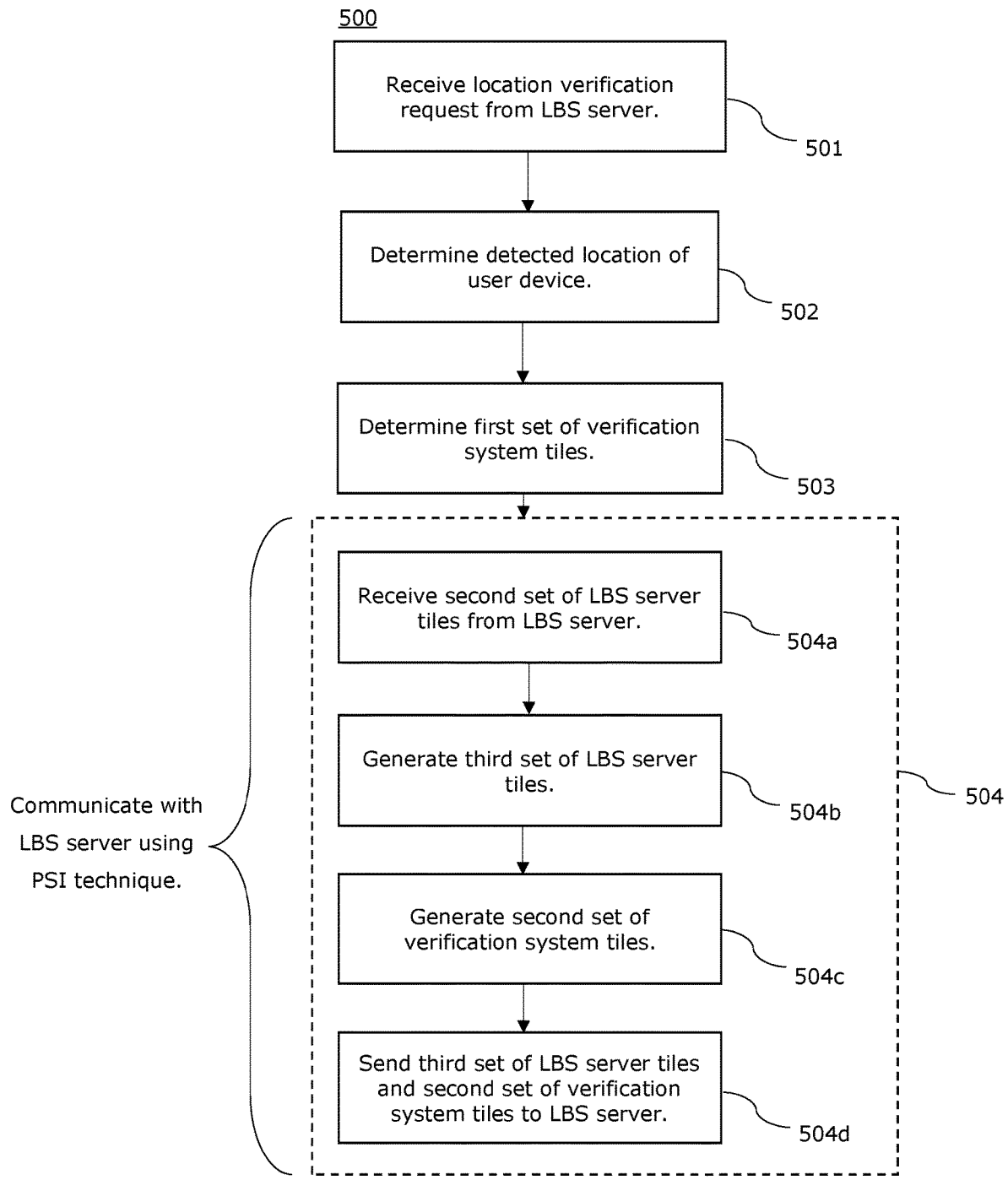
FIG. 5 illustrates a location verification method performed by a location verification system.

The corresponding method 500 performed by the location verification system 102 is illustrated in FIG. 5.

At step 501, the location verification system 102 receives the location verification request (including the device identifier) from the LBS server 101. As with the LBS server 101, the mobile device 103 may register with the location verification system 102 prior to the location verification method being performed. For example, when the location verification system 102 is an MNO system, the mobile device 103 may be registered with the MNO system by virtue of being a customer of the MNO, in which case a device identifier such as a phone number associated with the mobile device 103 will already be available to the MNO system.

Responsive to the location verification request, the location verification system 102 uses the device identifier to identify the mobile device 103 and use a network-based positioning technique (such as those described earlier) to determine a detected location of the mobile device 103 in step 502. The location verification system 102 may also determine an uncertainty (e.g. a probability distribution function) associated with the detected position.

Having determined the detected location of the mobile device 103, the location verification system 102 may then determine the first set of verification system tiles associated with the geographical area corresponding to the detected location in step 503. As with the first set of LBS server tiles generated by the LBS server 101, the location verification system 102 may determine the first set of verification system tiles based on one or more tile parameters such as a tile level.

In particular, the location verification system 102 may receive a first proposed tile level from the LBS server 101 and determine a second proposed tile level based on the uncertainty associated with the detected position. To ensure the private set intersection technique works correctly, the LBS server 101 and the location verification system 102 must use the same tiling level. The location verification system 102 therefore determines a confirmed tile level as the maximum of the first proposed tile level and the second proposed tile level (i.e. the tile level having the smallest geographic tile size) and sends the confirmed tile level to the LBS server 101. The first set of verification system tiles is then determined by the location verification system 102 using the confirmed tile level.

In step 504, the location verification system 102 communicates with the LBS server 101 using the private set intersection technique in order to determine whether at least one element of the first set of verification system tiles is also an element of the first set of LBS server tiles.

Steps 504a-504d illustrate the corresponding steps of the RSA-based private set intersection protocol performed by the location verification system 102 when the LBS server 101 performs the steps 404a-404e described above.

In step 504a, the location verification system 102 receives the second set of LBS server tiles from the LBS server 101.

In step 504b, the location verification system 102 generates the third set of LBS server tiles by individually encrypting each element of the second set of LBS server tiles with the private key as described above. Prior to this step, the location verification system 102 may generate the public key and distribute it to the LBS server 101.

In step 504c, the location verification system 102 generates the second set of verification system tiles by individually encrypting each element of the first set of location system tiles with the private key as described above.

In step 504d, the location verification system 102 sends the third set of LBS server tiles and the second set of verification system tiles to the LBS server 101 for location verification by the LBS server 101, at which point the LBS server 101 generates the fourth set of LBS server tiles by de-obfuscating the third set of LBS server tiles and compares the fourth set of LBS server tiles to the second set of verification system tiles to determine which (if any) elements are common to both sets.

As discussed earlier, using a private set intersection technique means that neither the LBS server 101 nor the location verification system gain knowledge about the location of the mobile device 103 that they did not already possess: the location verification method can only be used to verify/confirm what is already known.

In addition, the location verification method can also be used to enhance the position data known by the LBS server 101 without compromising user privacy. Provided that each element of the LBS tile sets is labelled (e.g. sequentially or with any other consistent labelling scheme which assigns a unique label to each element—the labels may be assigned arbitrarily/randomly, but they should be used consistently for all sets of LBS server tiles) or all elements of each set of LBS server tiles is ordered (i.e. the elements are in a specific order—this order may be arbitrary/random, but it should be used consistently for all sets of LBS server tiles), the LBS server 101 can not only determine whether the first set of LBS server tiles and the first set of verification system tiles have common elements, but it can also determine which elements those are, i.e. it can determine the actual tiles that are in the intersection set (e.g. those labelled 320 in FIG. 3b).

If each tile of the first set of LBS server tiles and the first set of verification system tiles has an associated probability that the mobile device 103 is in the geographical area represented by that tile (e.g. based on the respective uncertainties in the possible and detected locations), these probabilities can be combined to determine an updated or enhanced probability associated with each tile in the intersection set of tiles, which can in turn be used to infer a more accurate position of the mobile device 103.

The probabilities may be determined by computing tile probabilities around the mean position until a chosen confidence level is achieved. This can be viewed as a per-tile discretisation of the probability distribution or conversion of the continuous probability distribution to a probability mass function. As an example, a bivariate normal distribution, which is commonly the output of positioning algorithms, can be represented with a mean and a covariance matrix. A given confidence level determines the ellipse by which the actual location would be contained.

Figure 6:
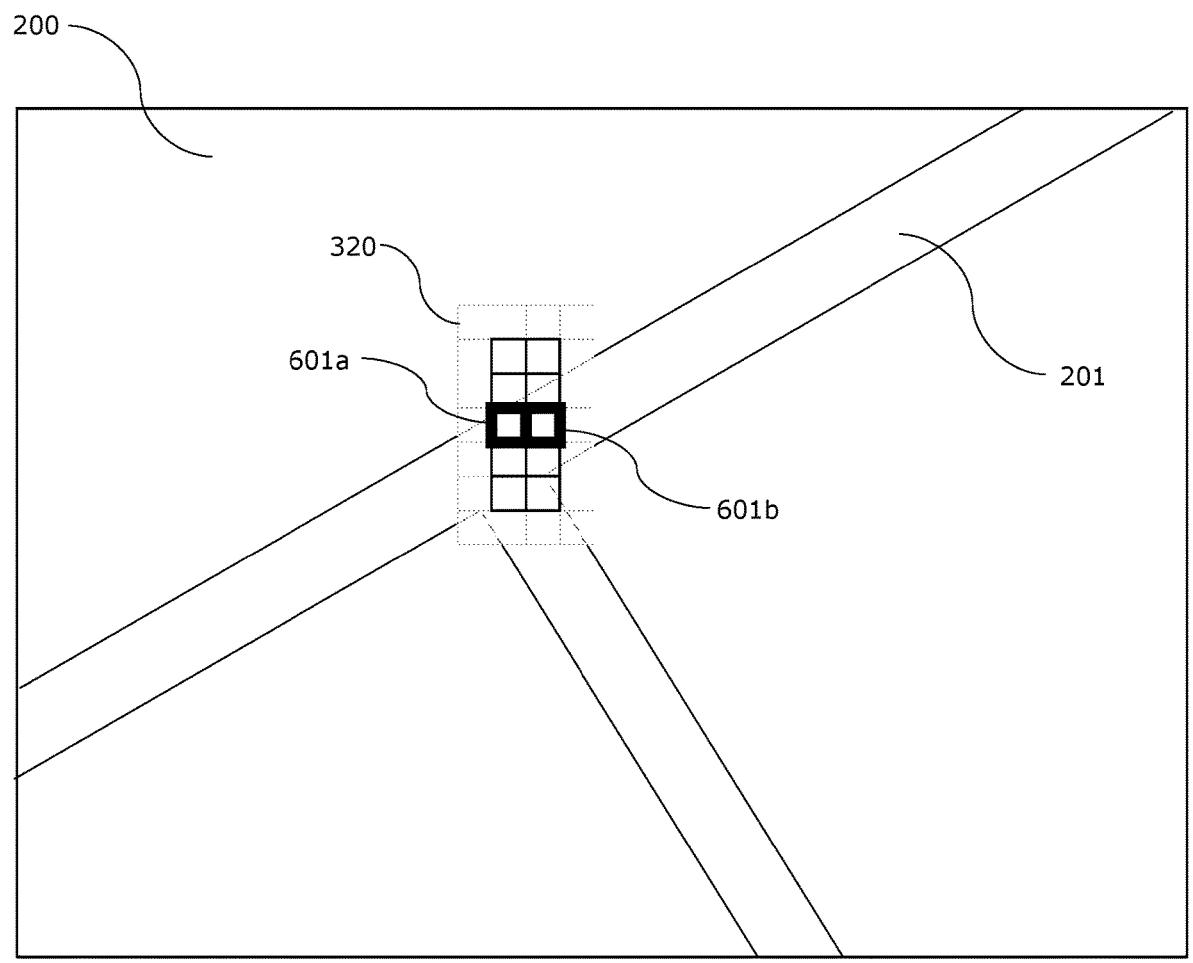
FIG. 6 represents a set of tiles in which the accuracy of location data associated with the mobile device has been enhanced.

FIG. 6 shows an example of how the probabilities can be combined. The tiles 320 represent the intersection set of tiles shown in FIG. 3*b*. By combining the probabilities associated with each tile of the first set of LBS server tiles and the first set of verification system tiles, an updated probability can be assigned to each tile in the set of tiles 320. Thicker lines in FIG. 6 represent tiles having a higher probability (i.e. these tiles correspond to a geographical area in which it is more likely that the mobile device 103 is actually located).

Figure 7:
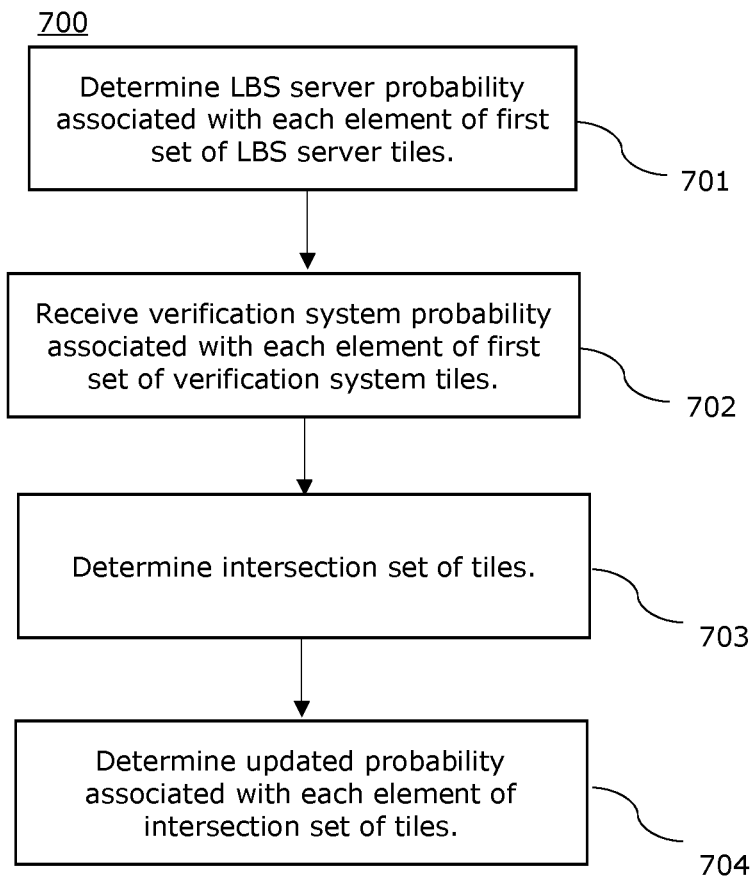
FIG. 7 illustrates a method performed by the LBS server for enhancing the accuracy of location data.

FIG. 7 illustrates an exemplary method 700 performed by the LBS server 101 for determining the updated/enhanced probabilities. This method may be performed as part of the method 400 shown in FIG. 4, e.g. as part of the method 400 or as subsequent steps to the method 400 (i.e. the method for updating the probabilities is an extension of the location verification method).

In step 701, the LBS server 101 determines an LBS server probability associated with each element of the first set of LBS server tiles (i.e. one probability associated with each tile). The probabilities are determined based on the uncertainty associated with the possible location of the mobile device 103 (e.g. using the probability distribution function associated with the possible location) and represent the probability that the mobile device 103 is actually located within each tile based on the location information known to the LBS server 101.

In step 702, the LBS server 101 receives a verification system probability associated with each element of the first set of verification system tiles from the location verification system 102 (again, one probability associated with each tile). The verification system probabilities are determined by the location verification system 102 in the same way that the LBS server 101 determines the LBS server probabilities (i.e. based on the uncertainty associated with the detected location).

In step 703, the LBS server 101 determines the intersection set of tiles that are common to the first set of LBS server tiles and the first set of verification system tiles. This may be determined as part of step 404*e* described earlier, i.e. when the LBS server 101 determines whether any elements of the fourth set of LBS server tiles are also elements of the second set of verification system tiles (there is a direct correspondence between elements of the first and fourth sets of LBS server tiles and between the first and second sets of verification system tiles, e.g. by using ordered sets and keeping the order of the elements the same or by labelling each element of each set using a consistent labelling scheme).

In step 704, the LBS server 101 determines an updated probability associated with each element of the intersection set of tiles. The updated probability associated with each element of the intersection set of tiles is calculated by multiplying the respective LBS server probability and verification system probability associated with that element of the intersection set of tiles (each element of the intersection set of tiles is also in the sets of LBS server and verification system tiles) and then normalising the probabilities such that the total probability across all tiles in the intersection set of tiles is equal to one (in other words, each tile in the intersection set 320 has an updated probability that is determined by combining the LBS server and verification system probabilities, and the sum of the updated probabilities associated with all of the tiles is one). Non-intersecting tiles have an updated probability of zero.

Depending upon the purpose for which the location is to be used, the LBS server 101 may use the updated probabilities to determine an updated location of the mobile device 103, which could be determined in several ways. For example, the updated location could be determined by selecting the intersection tile having the greatest updated probability value and setting the updated location equal to the centre of that tile. Alternatively, the updated probabilities could be used to interpolate a continuous probability distribution based on the updated probability associated with each element of the intersection set of tiles, and the mean of the continuous probability distribution could be determined and used as the updated location. Alternatively, the updated location could be determined by calculating a weighted average location based on the updated probabilities and corresponding centre of each tile in the intersection set (i.e. the updated probabilities are used as weights, and the centre of the corresponding tile is used as the position associated with that weight).

The result of the method 700 is that the location estimate can be improved without either party revealing its believed location of the mobile device 103.

Figure 8:
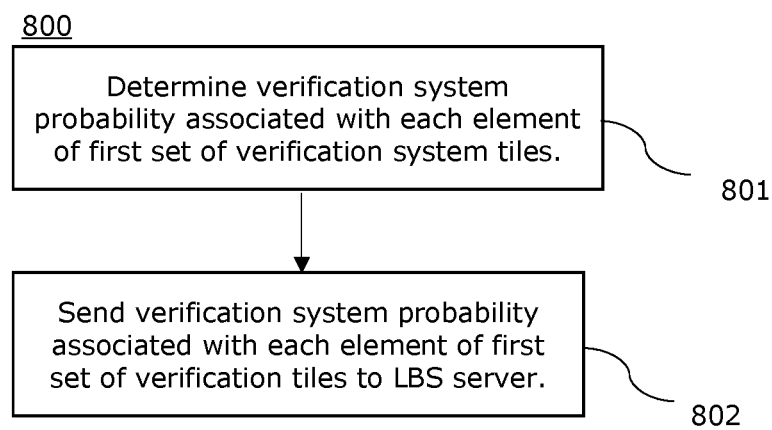
FIG. 8 illustrates a method performed by the location verification system for enhancing the accuracy of location data.

FIG. 8 shows the corresponding method 800 performed by the location verification system 102 when determining updated/enhanced location probabilities. This method may be performed as part of the method 500 described above.

At step 801, the location verification system 102 determines a probability associated with each element of the first set of verification system tiles. As explained above, these probability values are determined based on the uncertainty associated with the detected location.

At step 802, the location verification system 102 sends the verification system probabilities to the LBS server 101, which then determines the updated probabilities associated with the intersection set as explained above.

The method 800 may be performed as part of the method 500 shown in FIG. 5, e.g. at the same time as the method 500 or subsequently to the method steps in the method 500.

Alternative Location Verification Method

Figure 9:
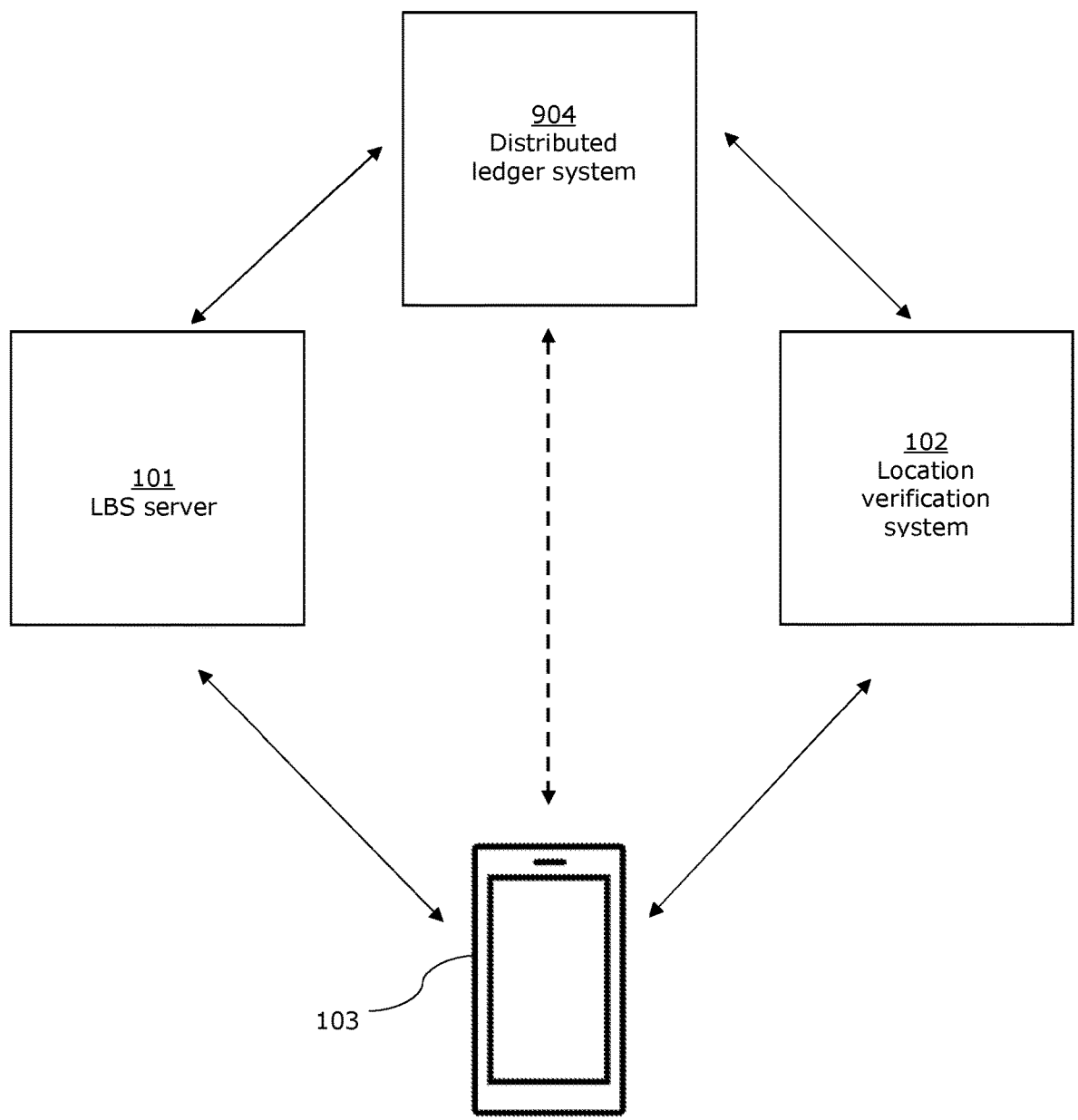
FIG. 9 shows a schematic representation of an alternative system for performing an alternative location verification method.

While the LBS server 101 and location verification system 102 may be in direct communication with each other, it is also possible to perform private location verification through an intermediary such as a distributed ledger system. An alternative system 900 including an LBS server 101, a verification system 102, a mobile device 103 and a distributed ledger system 904 is illustrated in schematic form in FIG. 9.

The LBS server 101, location verification system 102 and mobile device 103 are the same as the corresponding components of the system 100 illustrated in FIG. 1; these components will not be described in detail again in this section.

Instead of communicating directly with one another, the LBS server and location verification system 102 perform the location verification method via the distributed ledger system 904.

The distributed ledger system 904 is a system that maintains a distributed ledger across one or more virtual of physical computing/processing devices having, among other components, a processor, a memory and a communications interface. For example, the distributed ledger system 904 may be a node (or subset of nodes) of a large network of distributed ledger devices that maintain synchronised copies of the distributed ledger, or it may itself be the entire network of nodes. Blockchain is an example of a distributed ledger.

The distributed ledger maintained by the distributed ledger system 904 may be public, private, or a mixture of public and private elements.

The distributed ledger system 904 is in communication with the LBS server 101 and the location verification system 102, for example via the Internet or any other suitable communications channel. The distributed ledger 904 may optionally also be in communication with the mobile device 103, for example so that the mobile device 103 can register consent for its location to be verified.

In an example embodiment, the distributed ledger system 904 does not provide cellular services or location-based services to the mobile device 103 but simply acts as a mediator for the location verification procedure.

Figure 10:
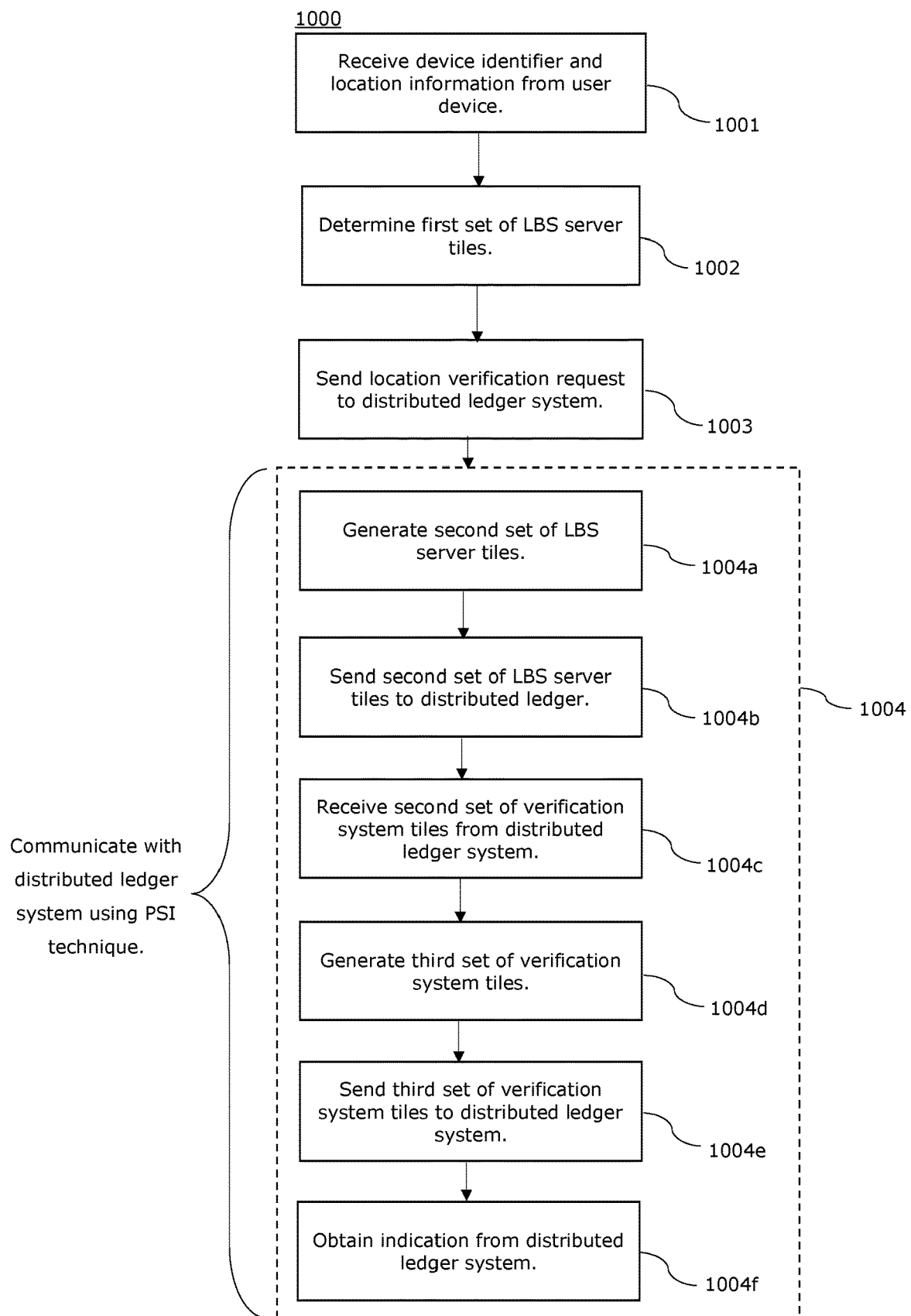
FIG. 10 illustrates an alternative location verification method performed by the LBS server.

The steps performed by the LBS server 101 in the alternative system 900 are shown in FIG. 10. In step 1001, the LBS server 101 receives the device identifier and location information from the mobile device 103 in the same manner as described above in relation to step 401 of FIG. 4.

Prior to sending the device identifier and location information to the LBS server 101, the mobile device 103 may register with the LBS server 101 as described in relation to the earlier method 400. Additionally or alternatively, the mobile device 103 may register with the distributed ledger system 904. As explained in more detail below, registering the mobile device 103 with the distributed ledger system 904 may involve the mobile device 103 providing consent for its location to be verified.

In step 1002, the LBS server 101 determines a first set of LBS server tiles in the same manner as described above in relation to step 402 of FIG. 4.

As with the earlier method 400, tile parameters such as the tiling scheme to be used and the tile level may be preconfigured so that the LBS server 101 and location verification system 102 generate tiles using the same tile parameters. Alternatively, one or more of the parameters may be agreed or negotiated between the LBS server 101 and the location verification system 102 as part of the location verification process, e.g. the tile parameters may be dynamic and be adjusted each time a location is verified.

Rather than communicating directly, the LBS server 101 and location verification system 102 can agree a tile level via the distributed ledger system 904. In particular, prior to determining the first set of LBS server tiles, the LBS server 101 may determine a proposed tile level based on the uncertainty associated with the possible location. The LBS server 101 can then send the proposed tile level to the distributed ledger system 904. At this stage, distributed ledger system 904 may send the proposed tile level to the verification system 102, which may respond with a confirmed tile level which can be sent from the distributed ledger system 904 to the LBS server 101.

Alternatively, instead of sending the proposed tile level to the location verification system 102, the distributed ledger system 904 may receive a second proposed tile level from the location verification system 103 (i.e. a proposed tile level determined by the location verification system 103), which could be sent in response to a location verification request sent from the distributed ledger system 904 to the location verification system 102. The distributed ledger system 904 may then determine a confirmed tile level as the maximum of the two proposed tile levels, and the confirmed tile level can be sent to both the LBS server 101 and the location verification system 102. The first set of LBS server tiles 101 is then determined using the confirmed tile level.

In step 1003, the LBS server sends a location verification request comprising the device identifier to the distributed ledger system 904. This step is analogous to the step 403 of FIG. 4 as described above, but the request is sent to the distributed ledger system 904 instead of being sent to the location verification system 103.

As explained in more detail below, once the distributed ledger system 904 receives the location verification request from the LBS server 101, it sends a second location verification request to the location verification system 102 which causes the location verification system 102 to determine the detected location of the mobile device 103 using one of the network-based positioning techniques discussed above. The LBS server 101 does not share the possible location with the distributed ledger system 904 or the location verification system 102, and the location verification system 102 does not share the detected location with the LBS server 101 or the distributed ledger system 904.

Once the location verification system 102 has determined the detected location of the mobile device 103 (and, if necessary, agreed a tile level and/or other tile parameters with the LBS server 101 via the distributed ledger system 904), the location verification system 102 determines a first set of verification system tiles associated with a geographical area corresponding to the detected location of the mobile device 103 (e.g. the tile sets 303 or 313 in FIGS. 3a and 3b respectively associated with the detected locations 203a and 213a in FIGS. 2a and 2b) as in the earlier method.

At step 1004, the LBS server 101 communicates with the distributed ledger system 904 using a private set intersection technique to determine whether any elements of the first set of LBS server tiles are also elements of the first set of verification system tiles to thereby verify the possible location. As with the earlier method, the use of a private set intersection technique means that the possible location can be verified without the LBS server 101 or the location verification system 102 sharing any location information that is not already known by the other party. In addition, the distributed ledger system 904 does not learn any location information associated with the mobile device 103.

Steps 1004a-1004f illustrate the steps of a possible private set intersection technique that can be employed in the method 1000. As the RSA-based private set intersection protocol used in steps 404a-404e of the earlier method 400 is intended to be performed when verifying a location without an intermediary, the steps of the private set intersection technique used in this alternative method 1000 are slightly different. In particular, the private set intersection technique used in steps 1004a-1004f is not RSA-based but instead uses commutative encryption techniques.

In step 1004a, the LBS server 101 generates a second set of LBS server tiles by individually encrypting each element of the first set of LBS server tiles using a commutive encryption scheme with a first private key known only to the LBS server 101. A commutative encryption scheme is one in which multiple layers of encryption (i.e. using different private keys) are performed does not affect the result of the encryption, i.e. for an encryption method $Enc_d$ (where d is a private key) $Enc_A(Enc_B(X))=Enc_B(Enc_A(X))$ for any two private keys A and B. By definition, this relationship also holds when encrypting with more than two private keys. An example of a suitable encryption scheme is ElGamal encryption. ElGamal is preferred due to its high level of security, but any commutative encryption scheme could be used.

When using ElGamal encryption, the LBS server 101 may generate a Diffie-Hellman public key using key generation parameters provided by the distributed ledger system 904 (these key generation parameters may also be sent to the location verification system 102 to allow the location verification system to generate a corresponding Diffie-Hellman public key). The Diffie-Hellman keys may be used in addition to the private keys when the sets of tiles are encrypted. The same key generation parameters may be used for multiple location verification requests from the LBS server 101, or different key generation parameters may be generated by the distributed ledger system 904 for each request. The key generation parameters may be stored by the distributed ledger and visible only to the LBS server 101 and the location verification system 102.

At step 1004b, the second set of LBS server tiles is sent from the LBS server 101 to the distributed ledger system 904.

At step 1004c, the LBS server 101 receives a second set of verification system tiles from the distributed ledger system 904. The second set of verification system tiles corresponds to the first set of verification system times in which each element of the first set of verification system tiles has been individually encrypted by the location verification system using the commutative encryption scheme with a second private key known only by the location verification system 102.

In order to enhance security, each element of the second set of verification system tiles may also have been encrypted by the distributed ledger system 904 using the commutative encryption scheme with a third private key known only to the distributed ledger system 904. This third layer of encryption makes the method resistant to possible future attacks that can exploit the knowledge of clear text and helps to protect against message replay attacks wherein the location verification system 102 could pretend to be the location verification system 102 and LBS server 101 at the same time to gain information that might not otherwise have been available to the location verification system 102. Such an additional encryption step is not possible with a two-party verification method (i.e. without the distributed ledger system 904).

At step 1004d, the LBS server 101 generates a third set of verification system tiles by individually encrypting each element of the second set of verification system tiles using the commutative encryption scheme with the first private key.

At step 1004e, the LBS server 101 sends the third set of verification system tiles to the distributed ledger system 1004e. At this point, the distributed ledger system 904 will compare the elements of the third set of verification system tiles to a third set of LBS server tiles in which each element of the second set of LBS server tiles has been individually encrypted by the location verification system 102 using the commutative encryption scheme with the second private key. For example, the distributed ledger system 904 may determine the intersection set of tiles common to the third set of LBS server tiles and the third set of verification system tiles.

At step 1004f, the LBS server 101 obtains an indication whether the possible location is verified, i.e. whether there are any intersecting elements. The distributed ledger 904 may actively send this to the LBS server 101, or the LBS server 101 may read the indication from an entry stored by the distributed ledger system 904. The indication may include the intersection set of tiles, or it may alternatively just be a binary (e.g. yes/no, true/false etc.) indication confirming whether the possible location was verified as correct.

Figure 11:
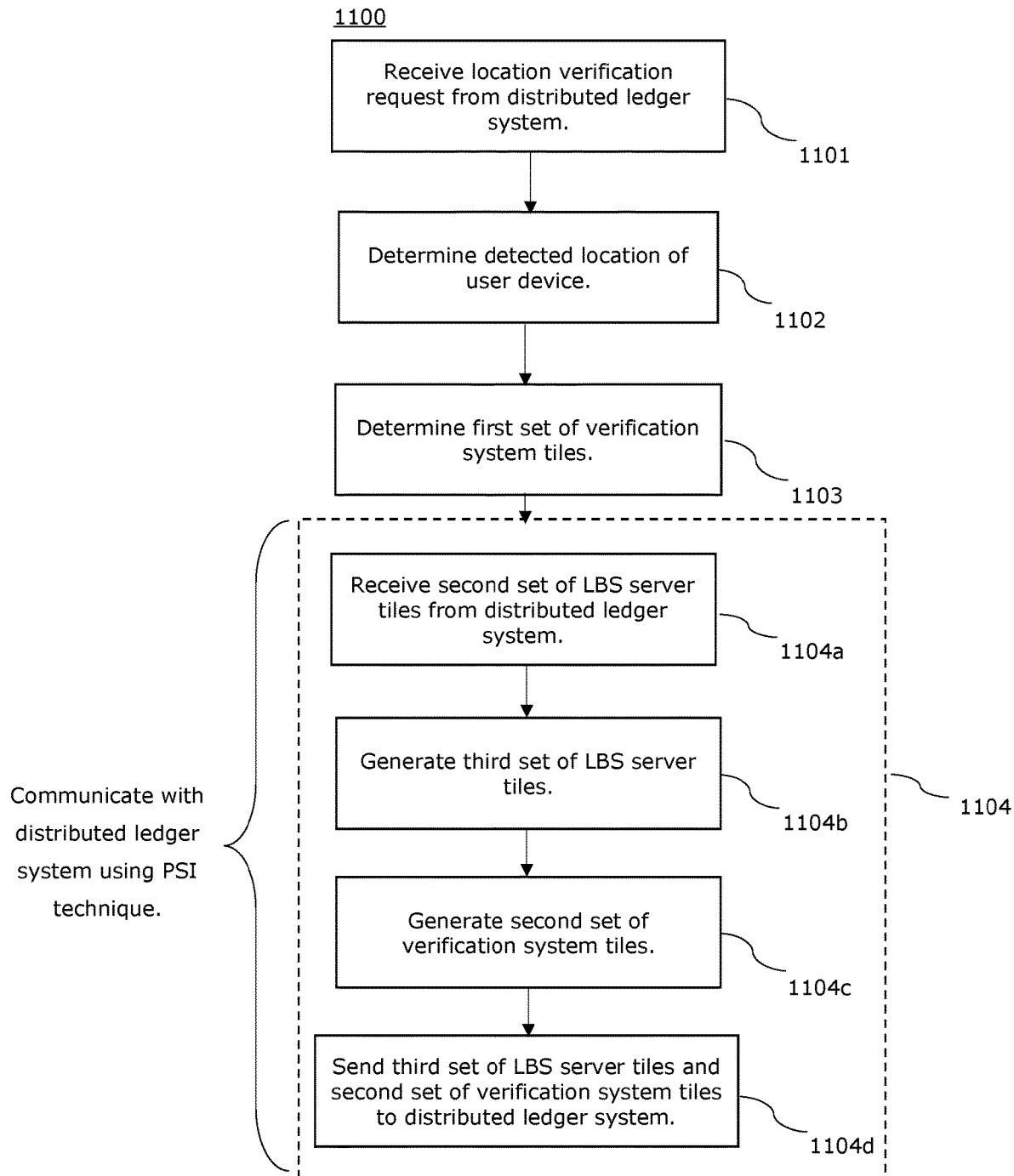
FIG. 11 illustrates an alternative location verification method performed by the location verification system.

The corresponding method performed by the location verification system 102 is shown in FIG. 11.

In step 1101, the location verification system 102 receives a location verification request (including the device identifier) from the distributed ledger system 904. For example, the distributed ledger system 904 may send the location verification request to the location verification system 102 in response to receiving the location verification request from the LBS server 101. The mobile device 103 may optionally register with the location verification system 102 prior to the method 1101 (as in the earlier method 500).

In step 1102, the location verification system 102 determines the detected location of the mobile device 103 as in step 502 of the method 500 in FIG. 5.

In step 1103, the location verification system 102 determines the first set of verification system tiles associated with the geographical area corresponding to the detected location as in step 503 of the method 500 in FIG. 5.

Prior to determining the fit set of verification system tiles, the location verification system 102 may agree a tile level with the LBS server 101. In particular, the location verification system 102 may receive a first proposed tile level from the distributed ledger system 904 and may determine a second proposed tile level based on the uncertainly associated with the detected location of the mobile device 103. The location verification system 102 may then determine a confirmed tile level as the maximum of the first proposed tile level and the second proposed tile level and send this to the distributed ledger system 904 to be forwarded to the LBS server 101.

Alternatively, rather than receiving a first proposed tile level from the distributed ledger system 904, the location verification system 102 may determine a proposed tile level based on the uncertainty associated with the detected location of the mobile device 103 and then send this proposed tile level to the distributed ledger system 904. The distributed ledger system 904 may then determine a confirmed tile level, which the location verification system 102 then receives from the distributed ledger system 904.

In step 1104, the location verification system 102 communicates with the distributed ledger system 904 using the private set intersection technique in order to determine whether at least one element of the first set of verification system tiles is also an element of the first set of LBS server tiles.

Steps 1104a-1104d illustrate the steps of the private set intersection technique performed by the location verification system 102 when the LBS server 101 performs the steps 1004a-1004e described above.

In step 1104a, the location verification system 102 receives the second set of LBS server tiles from the distributed ledger system 904.

In order to enhance security, each element of the second set of LBS server tiles may also have been encrypted by the distributed ledger system 904 using the commutative encryption scheme with the third private key known only to the distributed ledger system 904. As with the extra encryption of the second set of verification system tiles described above, this third layer of encryption makes the method resistant to possible future attacks that can exploit the knowledge of clear text and helps to protect against message replay attacks. Either both or neither of the sets of LBS server tiles and verification system tiles should be encrypted with the third private key to ensure the comparison can be performed successfully (i.e. if the second set of LBS server tiles has been encrypted with the third private key then the second set of verification system tiles should also be encrypted with the third private key and vice-versa).

In step 1104*b*, the location verification system generates the third set of LBS server tiles by individually encrypting each element of the second set of LBS server tiles using the commutive encryption scheme with the second private key known only to the location verification system 102. For example, the location verification system may use ElGamal encryption with a Diffie-Hellman public key generated using key generation parameters provided by the distributed ledger system 904.

In step 1104*c*, the location verification system 102 generates the second set of verification system tiles by individually encrypting each element of the first set of verification system tiles using the commutive encryption scheme with the second private key known only to the location verification system 102 (the order of steps 1104*b* and 1104*c* could be reversed).

In step 1104*d*, the location verification system 102 sends the third set of LBS server tiles and the second set of verification system tiles to the distributed ledger system 904 for location verification by the distributed ledger system 904 (these sets of tiles could also be sent in separate steps).

Figure 12:
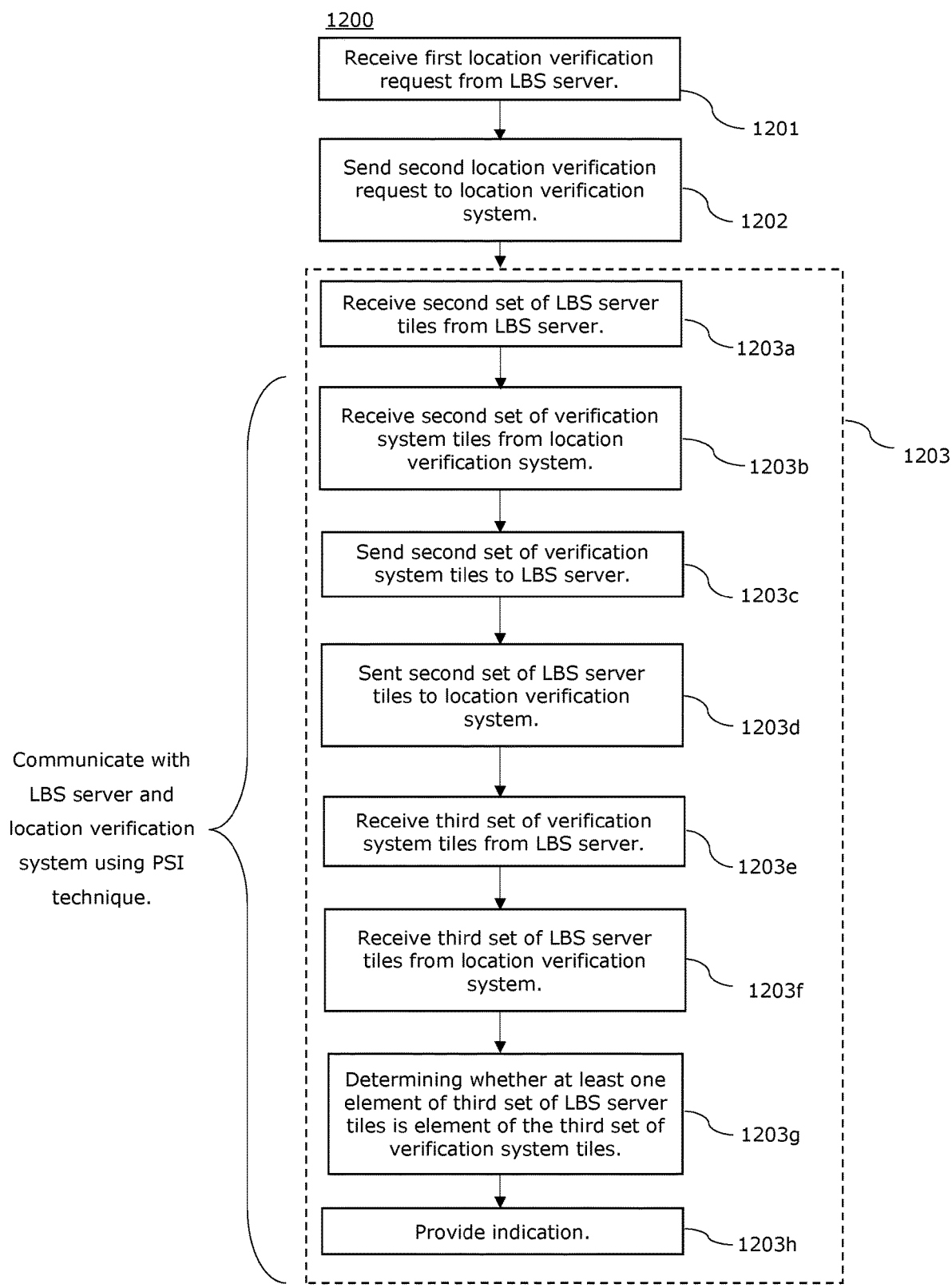
FIG. 12 illustrates an alternative location verification method performed by a distributed ledger system.

The corresponding method 1200 performed by the distributed ledger system 904 is shown in FIG. 12. At step 1201, the distributed ledger system 904 receives the (first) location verification request from the LBS server 101. At this stage, the distributed ledger 904 may generate a session identifier associated with the location verification request and send this to the LBS server 101. The session identifier may be used in all subsequent communications between the distributed ledger system 904 and the LBS server 101 and location verification system 102 in order to identify the session.

At step 1202, the distributed ledger system 904 sends a second location verification request to the location verification system 102 to cause the location verification system 102 to determine the detected location of the mobile device 103. The session identifier may also be sent to the location verification system 102 (e.g. as part of the second location verification request).

At step 1203, the distributed ledger system 904 verifies the possible location by communicating the with LBS server 101 and the location verification system 102 using the private set intersection technique to determine whether at least one element of the first set of LBS server tiles determined by the LBS server 101 is also an element of the first set of verification system tiles determined by the location verification system 102.

Steps 1204*a*-1204*h* illustrate the steps of the private set intersection technique performed by the distributed ledger system 904 when the LBS server 101 performs the steps 1004*a*-1004*e* described above and the location verification system 102 performs the step 1104*a*-1104*d* described above.

In steps 1203*a* and 1203*b*, the distributed ledger system 904 receives the second set of LBS server tiles and the second set of verification system tiles from the LBS server 101 and the location verification system 102 respectively.

In steps 1203*c* and 1204*d*, the distributed ledger system 904 sends the second set of verification system tiles and the second set of LBS server tiles to the LBS server 101 and the location verification system 102 respectively.

As described above, the distributed ledger system 904 may optionally encrypt the second set of LBS server tiles and second set of verification system tiles using the commutative encryption scheme with the third private key known only to the distributed ledger system 904 before sending them to the location verification system 102 and LBS server 101 respectively. As discussed above, this third layer of encryption makes the method resistant to possible future attacks that can exploit the knowledge of clear text and helps to protect against message replay attacks.

In steps 1203*e* and 1203*f*, the distributed ledger system 904 receives the third set of verification system tiles and the third set of LBS server tiles from the LBS server 101 and the location verification system 102 respectively.

In step 1203*g*, the distributed ledger system 904 determines whether at least one element of the third set of LBS server tiles is also an element of the third set of verification system tiles, e.g. by determining the intersection set of tiles that are common to the third set of LBS server tiles and the third set of verification system tiles.

In step 1203*h*, the distributed ledger system 904 provides an indication of whether at least one element of the third set of LBS server tiles is also an element of the third set of verification system tiles. For example, the distributed ledger system 904 may allow the LBS server 101 (or third-party systems) to access or read the indication to ensure that the location data has been verified. A third party may wish to access the indication to ensure that location data being supplied by the LBS server 101 is accurate (e.g. if the third party has purchased services such as real-time mapping data from the LBS provider). Alternatively, providing the indication may involve actively sending the indication to the LBS server 101 or a third party.

In addition, providing the indication may comprise providing the intersection set of tiles common to the third set of LBS server tiles and the third set of verification system tiles.

During or before the method 1200, the distributed ledger system 904 may provide key generation parameters to the LBS server 101 and the location verification system 102 for use in the encryption process (e.g. when the encryption method is ElGamal, the key generation parameters may be used by the LBS server 101 and the location verification system 102 to generate Diffie-Hellman public keys).

In addition, the mobile device 103 may register with the distributed ledger system 904. The registration may involve the mobile device 103 providing the device identifier and giving consent for its location to be verified. The consent may be perpetual (i.e. last until it is withdrawn) or it may expire after a predetermined location or at a certain time. The distributed ledger system 904 can then check that consent has been provided before allowing the method 900 to be performed (e.g. after receiving the location verification request from the LBS server 101 and before sending the second location verification request to the location verification system 102). By registering the consent of the mobile device 103, users can control whether (and when) the LBS system 101 can verify their location and can easily withdraw consent, thereby improving user privacy.

If consent has not been received from the mobile device 103, the distributed ledger system 904 may respond to the location verification request from the LBS server 101 with an error message indicating that the mobile device 103 has not provided consent for its possible location to be verified.

The alternative location verification method described above can also be used to allow the mobile device 103 to provide proof of its location. A record containing the possible location, intersecting tiles, verification time, verification result, session identifier and device identifier can be stored in the distributed ledger. The user can then provide the session identifier to a third party as a location certification, and the third party can then retrieve the record from the distributed ledger.

Figure 13:
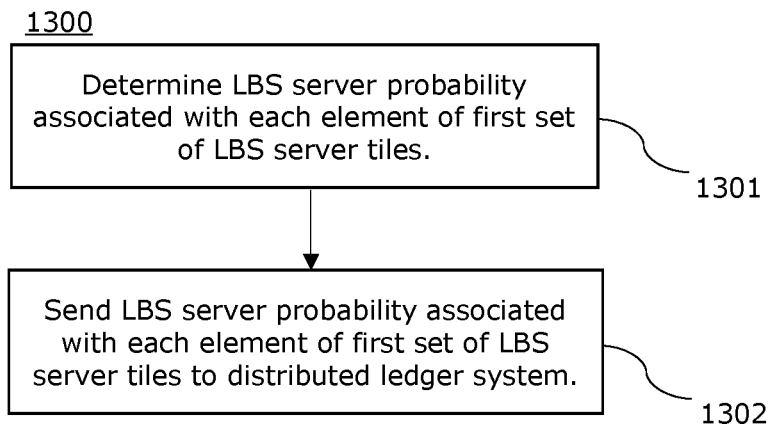
FIG. 13 illustrates an alternative method performed by the LBS server for enhancing the accuracy of location data.
Figure 14:
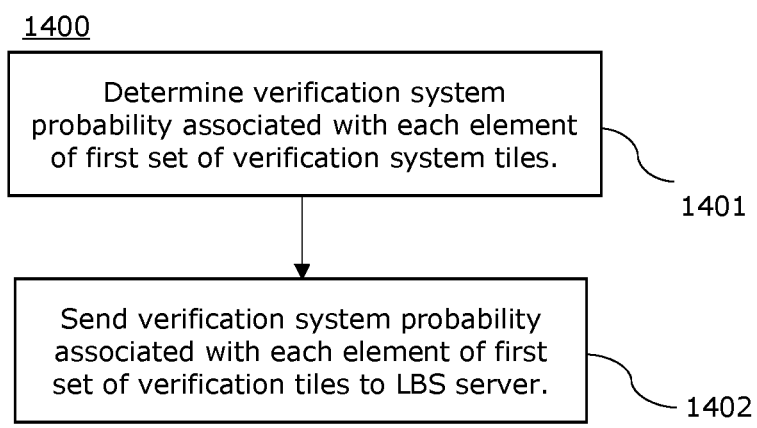
FIG. 14 illustrates an alternative method performed by the location verification system for enhancing the accuracy of location data.
Figure 15:
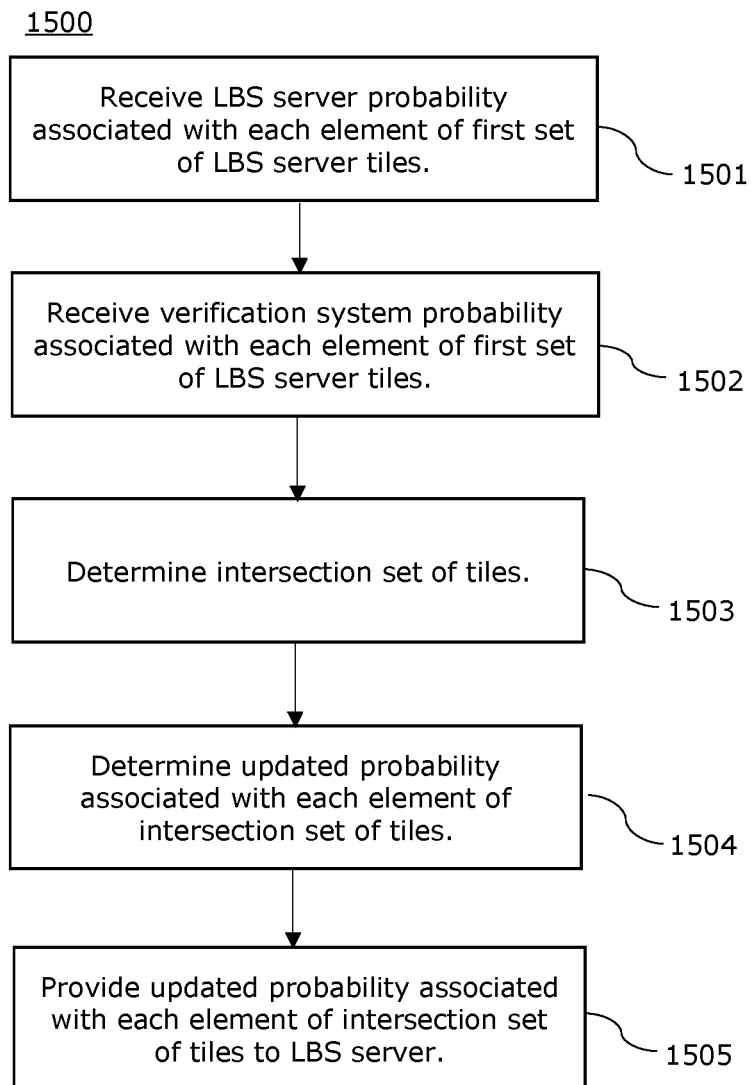
FIG. 15 illustrates an alternative method performed by the distributed ledger system for enhancing the accuracy of location data.

As with the earlier location verification method illustrated in FIGS. 4 and 5, the alternative location verification method illustrated in FIGS. 10-12 can also be used to enhance the position data known by the LBS server 101 without compromising user privacy by combining probabilities associated with the tiles as explained earlier. FIGS. 13-15 illustrate how this method may be performed by the alternative system 900. The methods 1300, 1400 and 1500 can be performed as part of the methods 1000, 1100 and 1200 respectively (either simultaneously or subsequently), i.e. they are an extension of the alternative location verification method.

The method 1300 performed by the LBS server 101 for determining the updated/enhanced probabilities is shown in FIG. 13.

At step 1301, the LBS server 101 determines an LBS server probability associated with each element of the first set of LBS server tiles as in step 701 of the method 700 described earlier.

At step 1302, the LBS server 101 sends the LBS server probabilities associated with each element of the first set of LBS server tiles to the distributed ledger system 904.

The corresponding method 1400 performed by the location verification system 102 for determining the updated/enhanced probabilities is shown in FIG. 14.

At step 1401, the location verification system 102 determines a verification system probability associated with each element of the first set of LBS server tiles as in step 801 of the method 800 described earlier.

At step 1402, location verification system 102 sends the verification system probabilities associated with each element of the first set of verification system tiles to the distributed ledger system 904.

The corresponding method 1400 performed by the distributed ledger system 904 for determining the updated/enhanced probabilities is shown in FIG. 14.

At steps 1501 and 1502, the distributed ledger system 904 receives the verification system probability associated with each element of the first set of LBS server tiles from the LBS server 101 and the verification system probabilities associated with each element of the first set of verification system tiles from the location verification system 102.

At step 1503, the distributed ledger system 904 determines the intersection set of tiles that are common to the first set of LBS server tiles and the first set of verification system tiles. This may be determined as part of step 1203g described earlier, i.e. when the distributed ledger system 904 determines whether any elements of the third set of LBS server tiles are also elements of the third set of verification system tiles (there is a direct correspondence between elements of the first and third sets of LBS server and verification system tiles, e.g. by using ordered sets and keeping the order of the elements the same or by labelling each element of each set using a consistent labelling scheme).

At step 1504, the distributed ledger system 904 determines an updated probability associated with each element of the intersection set of tiles. As in step 704 described above, the updated probability associated with each element of the intersection set of tiles is calculated by multiplying the respective LBS server probability and verification system probability associated with that element of the intersection set of tiles and then normalising the probabilities such that the total probability across all tiles in the intersection set of tiles is equal to one.

The distributed ledger system 904 can then provide the updated probabilities to the LBS server 101 (e.g. by actively sending the probabilities to the LBS server or making the probabilities available for the LBS server 101 to access/read). Alternatively, the LBS server 101 may calculate the updated probabilities. For example, instead of sending the LBS server probabilities to the distributed ledger system 904, the LBS server 101 could receive the verification system probabilities from either the distributed ledger system 904 or the location verification system 102. The distributed ledger system 904 could also provide the LBS server 101 with the intersection set of tiles common to the third set of LBS server tiles and the third set of verification system tiles.

Depending upon the purpose for which the location is to be used, the LBS server 101 may use the updated probabilities to determine an updated location of the mobile device 103, which could be determined in several ways as discussed in relation to the earlier method 700. For example, the updated location could be determined by selecting the intersection tile having the greatest updated probability value and setting the updated location equal to the centre of that tile, by using the updated probabilities to interpolate a continuous probability distribution, or by using a weighted average.

Tiling schemes often use similar labels for geographically proximate tiles, e.g. the labels/identifiers of adjacent tiles may differ only by a single digit/character. As an additional security step, each element of the first sets of tiles may therefore be hashed in any of the above methods (e.g. methods 400 and 500, or 1000-1300) using a hashing algorithm (with the LBS server 101 and location verification system 102 using the same hashing algorithm). Hashing ensures that all elements of each tile set appear very different to each other even though they are geographically close, which makes the method more secure against attacks.

In any of the above methods (i.e. in either the first or the alternative location verification method), the steps may be performed in different orders unless specified otherwise or technically impossible. For example, the LBS server 101 could generate the first and/or second sets of LBS server tiles before or after sending the location verification request (especially if using a pre-agreed tiled level). Similarly, the location verification system 102 could generate the first and/or second sets of verification system tiles before or after receiving the second set of LBS server tiles. Furthermore, the third set of LBS server tiles and second set of verification system tiles could be sent separately rather than in a single step. One skilled in the art will recognise other variations to the steps are possible, and the above methods are intended to be exemplary rather than limiting.

Location Verification Apparatus and Media

Figure 16:
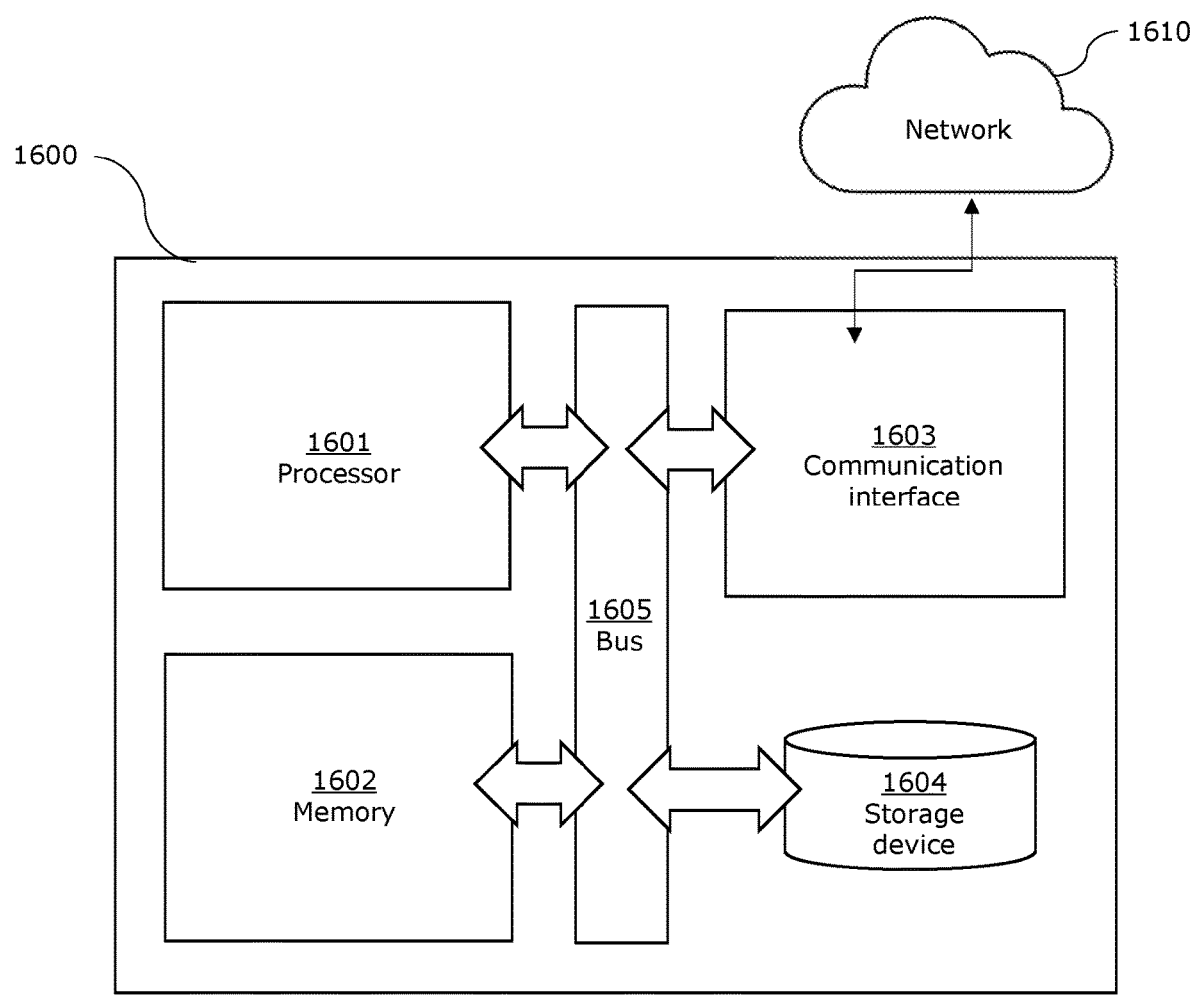
FIG. 16 shows a schematic representation of an exemplary computing apparatus; and, FIG. 17 illustrates a computer readable medium.

FIG. 16 shows an apparatus which may perform methods described herein (including but not limited to methods 400, 500, 700, 800 and 1000-15000). In some arrangements, a system comprising multiple apparatuses could perform the methods disclosed herein, with different steps of the methods being performed by different apparatuses. For example, one or more apparatuses of the location verification system 102 could determine a detected location of the mobile device 103, and another apparatus could generate the sets of tiles and communicate with the LBS server 101 and/or distributed ledger system 904.

The apparatus 1600 of FIG. 16 includes a processor 1601 coupled to a memory 1602, a communication interface 1603 and a storage device 1604 via a bus 1605. It will be appreciated that additional components, such as additional interfaces etc. could be provided. The communication interface 1603 is coupled to a network 1610 such as the Internet. The communications interface 1603 enables communications by a wired connection (such as an ethernet connection) and/or a wireless connection (such as Wi-Fi, Bluetooth, cellular/mobile network etc).

The apparatus 1600 may be an example any one of (or component of) the LBS server 101, the location verification system 102, the mobile device 103 and the distributed ledger system 904.

The processor 1601 (and/or co-processors or any other processing circuitry assisting or otherwise associated with the processor) is in communication with the memory 1602 via the bus 1605 for passing information among components of the apparatus 1600. The internal connections between the memory 1602 and the processor 1601 can be understood to provide active coupling between the processor 1601 and the memory 1602 to allow the processor 1602 to access computer program code stored on the memory 1602.

The memory 1602 may be non-transitory and may include, for example, one or more volatile and/or non-volatile memories. In other words, for example, the memory 1602 may be an electronic storage device (e.g. a computer-readable storage medium) comprising gates configured to store data (for example, bits) that may be retrievable by a machine (e.g. a computing device like the processor 1601). The memory 1602 may be solid-state memory, a hard disk drive (HDD), read-only memory (ROM), random-access memory (ROM), flash memory or another type of memory. The memory 1602 may be configured to store information, data, content, applications, instructions or the like executable by processor 1601 for enabling the apparatus 1600 to carry out various functions in accordance with an example of the present disclosure. For example, the memory 1602 could be configured to buffer input data for processing by the processor 1601. Additionally or alternatively, the memory 1602 could be configured to store instructions for execution by the processor 1601. For example, memory 1602 may be configured to store computer program instructions which, when executed by the processor 1601, cause the apparatus 1600 to perform a method as described herein.

The processor 1601 may be embodied in a number of different ways. For example, the processor 1601 may be embodied as one or more of various hardware processing means such as a coprocessor, a microprocessor, a controller, a digital signal processor (DSP), a processing element with or without an accompanying DSP, or various other processing circuitry including integrated circuits such as, for example, an application specific integrated circuit (ASIC), a field programmable gate array (FGPA), a microcontroller unit (MCU), a hardware accelerator, a special-purpose computer chip, or the like. As such, in some arrangements, the processor may include one or more processing cores (of the same or different types) configured to perform independently. A multi-core processor may enable multiprocessing within a single physical package. Additionally or alternatively, the processor 1601 may include one or more processors configured in tandem via the bus to enable independent execution of instructions, pipelining and/or multithreading.

In some arrangements, the processor 1601 may be configured to execute instructions stored in the memory 1602 or otherwise accessible to the processor 1601. Alternatively or additionally, the processor 1601 may be configured to execute hard coded functionality. As such, whether configured by hardware or software methods, or by a combination thereof, the processor 1601 may represent an entity (for example, physically embodied in circuitry) capable of performing operations according to a method of the present disclosure while configured accordingly. Thus, for example, when the processor 1601 is embodied as an ASIC, FPGA or the like, the processor may be specifically configured hardware for conducting the operations described herein. Alternatively, as another example, when the processor 1601 is embodied as an executor of software instructions, the instructions may specifically configure the processor 1601 to perform the algorithms and/or operations described herein when the instructions are executed. However, in some cases, the processor 1601 may be a processor specific device (for example, a mobile terminal or a fixed computing device) configured to employ a method of the present disclosure by further configuration of the processor by instructions for performing the algorithms and/or operations described herein. The processor 1601 may include, among other things, a clock, an arithmetic logic unit (ALU) and logic gates configured to support operation of the processor.

The communication interface 1603 may be any means such as a device or circuitry embodied in either hardware or a combination of hardware and software that is configured to receive and/or transmit data to/from a communications device in communication with the apparatus 1600. In this regard, the communication interface 1603 may include, for example, an antenna (or multiple antennae) and supporting hardware and/or software for enabling communications with a wireless communication network. Additionally or alternatively, the communication interface 1603 may include the circuitry for interacting with the antenna(s) to cause transmission of signals via the antenna(s) or to handle receipt of signals received via the antenna(s). In some environments, the communication interface 1603 may alternatively or also support wired communication. As such, for example, the communication interface 1603 may include a communication modem and/or other hardware and/or software for supporting communication via cable, digital subscriber line (DSL), universal serial bus (USB) or other mechanisms.

The apparatus 1600 may also include an optional user interface that may be in communication with the processor 1601 to provide output to the user and, in some arrangements, to receive an indication of a user input. As such, the user interface may include a display and may also include a keyboard, a mouse, a joystick, a touch screen, touch areas, soft keys, one or more microphones, a plurality of speakers, or other input/output mechanisms. In one arrangement, the processor 1601 may comprise user interface circuitry configured to control at least some functions of one or more user interface elements such as a display and, in some arrangements, a plurality of speakers, a ringer, one or more microphones and/or the like. The processor 1601 and/or user interface circuitry comprising the processor may be configured to control one or more functions of one or more user interface elements through computer program instructions (for example, software and/or firmware) stored on a memory accessible to the processor 1601 (for example, memory 1602, and/or the like). The processor 1601 may receive data via the user interface and/or the communications interface 1603 and the memory 1602 may be configured to store data received via the user interface and/or the communication interface 1603.

Figure 17:
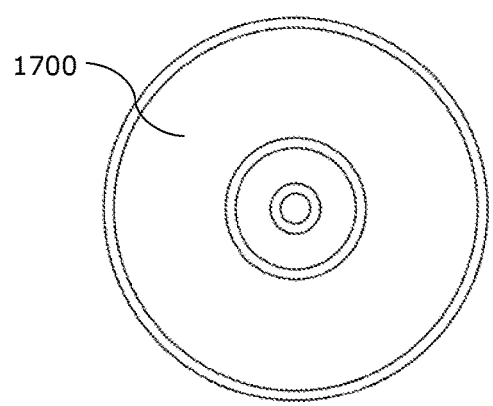

FIG. 17 shows an exemplary computer-readable medium 1700 comprising a computer program configured to perform, control or enable the steps of any method described herein. The computer program may comprise computer code configured to perform the method(s). In this example, the computer/processor readable medium 1700 is a disc such as a digital versatile disc (DVD) or a compact disc (CD). In other examples, the computer/processor readable medium 1700 may be any medium that has been programmed in such a way as to carry out an inventive function. The computer/processor readable medium 1700 may be a removable memory device such as a memory stick or memory card (SD, mini-SD, micro-SD or nano SD card). In some arrangements, the computer-readable medium 1000 may be non-transitory.

It will be appreciated by the skilled reader that any mentioned apparatus/device and/or other features of particular mentioned apparatus/device may be provided by apparatus arranged such that they become configured to carry out the desired operations when enabled, e.g. switched on, or the like. In such cases, they may not necessarily have the appropriate software loaded into the active memory in the non-enabled (e.g. switched off state) and only load the appropriate software in the enabled (e.g. on state). The apparatus may comprise hardware circuitry and/or firmware. The apparatus may comprise software loaded onto memory. Such software/computer programs may be recorded on the same memory/processor/functional units and/or on one or more memories/processors/functional units.

In some examples, a particular mentioned apparatus/device may be pre-programmed with the appropriate software to carry out desired operations, and wherein the appropriate software can be enabled for use by a user downloading a "key", for example, to unlock/enable the software and its associated functionality Such examples can allow a reduced requirement to download data when further functionality is required for a device, and this can be useful in examples where a device is perceived to have sufficient capacity to store such pre-programmed software for functionality that may not be enabled by a user.

It will be appreciated that any mentioned apparatus/circuitry/elements/processor may have other functions in addition to the mentioned functions, and that these functions may be performed by the same apparatus/circuitry/elements/processor. One or more disclosed aspects may encompass the electronic distribution of associated computer programs and computer programs (which may be source/transport encoded) recorded on an appropriate carrier (e.g. memory, signal).

It will be appreciated that any "computer" described herein can comprise a collection of one or more individual processors/processing elements that may or may not be located on the same circuit board, or the same region/position of a circuit board or even the same device. In some examples one or more of any mentioned processors may be distributed over a plurality of devices. The same or different processor/processing elements may perform one or more functions described herein.

With reference to any discussion of any mentioned computer and/or processor and memory (e.g. including ROM, CD-ROM etc.), these may comprise a computer processor, Application Specific Integrated Circuit (ASIC), field-programmable gate array (FPGA), and/or other hardware components that have been programmed in such a way to carry out the inventive function.

It will be appreciated that the term "circuitry" may refer to one or more or all of the following: (a) hardware-only circuit implementations (such as implementations in only analogue and/or digital circuitry) and (b) combinations of hardware circuits and software, such as (as applicable): (i) a combination of analogue and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and/or processor(s), such as a microprocessor(s) or a portion of a microprocessor(s), that requires software (e.g. firmware) for operation, but the software may not be present when it is not needed for operation.

This definition of circuitry applies to all uses of this term in this application, including in the claims. As a further example, as used in this application the term circuitry also covers and implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Although the foregoing description and the associated drawings describe certain example combinations of features, it should be appreciated that different combinations of features may be provided by alternative arrangements without departing from the scope of the appended claims. In this regard, the applicant hereby discloses in isolation each individual feature described herein and any combination of two or more such features, to the extent that such features or combinations are capable of being carried out based on the present specification as a whole, in the light of the common general knowledge of a person skilled in the art, irrespective of whether such features or combinations of features solve any problems disclosed herein, and without limitation to the scope of the claims.

In view of the foregoing description it will be evident to a person skilled in the art that various modifications may be made within the scope of the disclosure. Therefore, it is to be understood that the disclosure is not to be limited to the specific examples described above and that modifications and other arrangements are intended to be included within the scope of the appended claims. It will be understood that various omissions and substitutions and changes in the form and details of the devices and methods described may be made by those skilled in the art without departing from the scope of the disclosure. For example, it is expressly intended that all combinations of those elements and/or method steps which perform substantially the same function in substantially the same way to achieve the same results are within the scope of the disclosure. Moreover, it should be recognized that structures and/or elements and/or method steps shown and/or described in connection with any disclosed form or example may be incorporated in any other disclosed or described or suggested form or example as a general matter of design choice. Furthermore, in the claims means-plus-function clauses are intended to cover the structures described herein as performing the recited function and not only structural equivalents, but also equivalent structures.

What is claimed is:

1. A computer-implemented method for verifying a location of a mobile device comprising, at a location-based services (LBS) server:
   receiving, from the mobile device, a device identifier associated with the mobile device and location information indicating a possible location of the mobile device;

determining a first set of LBS server tiles corresponding to a geographical area associated with the possible location of the mobile device;

sending a location verification request to a location verification system, the location verification request comprising the device identifier and causing the location verification system to determine a detected location of the mobile device using network-based positioning; and, verifying the possible location by communicating with the location verification system using a private set intersection technique to determine whether at least one element of the first set of LBS server tiles is also an element of a first set of verification system tiles corresponding to a geographical area associated with the detected location of the mobile device, the first set of verification system tiles determined by the location verification system, wherein the first set of LBS server tiles and the first set of verification system tiles are generated using the same tiling scheme and the same tile level.

2. The method of claim 1, wherein verifying the possible location comprises, at the LBS server:

generating a second set of LBS server tiles by individually obfuscating and encrypting each element of the first set of LBS server tiles using a public key;

sending the second set of LBS server tiles to the location verification system;

receiving a third set of LBS server tiles and a second set of verification system tiles from the location verification system, wherein the third set of LBS server tiles corresponds to the second set of LBS server tiles in which each element has been individually encrypted using a private key associated with the public key, and wherein the second set of verification system tiles corresponds to the first set of verification system tiles in which each element has been individually encrypted using the private key;

generating a fourth set of LBS server tiles by de-obfuscating each element of the third set of LBS server tiles; and, verifying whether the possible location corresponds to the detected location by determining whether at least one element of the fourth set of LBS server tiles is also an element of the second set of verification system tiles.

3. The method of claim 1, wherein the location information comprises an uncertainty associated with the possible location; and wherein the first set of LBS server tiles is determined based on the uncertainty associated with the possible location.

4. The method of claim 3, further comprising, at the LBS server:

determining, based on the uncertainty associated with the possible location, a respective LBS server probability associated with each element of the first set of LBS server tiles;

receiving, from the location verification system, a respective verification system probability associated with each element of the first set of verification system tiles;

determining an intersection set of tiles common to the first set of LBS server tiles and the first set of verification system tiles; and, determining an updated probability associated with each element of the intersection set of tiles by combining and normalizing the respective LBS server probability and verification system probability associated with each element of the intersection set of tiles.

5. The method of claim 4, further comprising determining, at the LBS server, an updated location based on the updated probability associated with each element of the intersection set of tiles.

6. The method of claim 5, wherein determining an updated location comprises:

interpolating a continuous distribution based on the updated probability associated with each element of the intersection set of tiles; and, determining a mean of the continuous distribution, wherein the updated location is the mean of the continuous distribution.

7. The method of claim 3, further comprising, at the LBS server:

determining a proposed tile level based on the uncertainty associated with the possible location;

sending the proposed tile level to the location verification system; and, receiving, from the location verification system, a confirmed tile level, wherein the first set of LBS server tiles is determined based on the confirmed tile level.

8. A computer-implemented method for verifying a location of a mobile device comprising, at a location verification system:

receiving, from a location-based services (LBS) server, a location verification request comprising a device identifier associated with the mobile device;

determining a detected location of the mobile device using network-based positioning;

determining a first set of verification system tiles corresponding to a geographical location associated with the detected location of the mobile device; and, communicating with the LBS server using a private set intersection technique in order to determine whether at least one element of the first set of verification system tiles is also an element of a first set of LBS server tiles corresponding to a geographical area associated with a possible location of the mobile device known by the LBS server, wherein the first set of LBS server tiles and the first set of verification system tiles are generated using the same tiling scheme and the same tile level.

9. The method of claim 8, wherein communicating with the LBS server using a private set intersection technique comprises, at the location verification system:

receiving, from the LBS server, a second set of LBS server tiles corresponding to the first set of LBS server tiles in which each element has been individually obfuscated and encrypted using a public key;

generating a third set of LBS server tiles by individually encrypting each element of the second set of LBS server tiles using a private key associated with the public key;

generating a second set of verification system tiles by individually encrypting each element of the first set of verification system tiles using the private key; and, sending the third set of LBS server tiles and the second set of verification system tiles to the LBS server for location verification by the LBS server.

10. The method of claim 8, wherein determining the detected location of the mobile device comprises determining an uncertainty associated with the detected location, and wherein the first set of verification system tiles is determined based on the uncertainty associated with the detected location.

11. The method of claim 10, further comprising, at the location verification system:

determining, based on the uncertainty associated with the detected location, a respective verification system probability associated with each element of the first set of verification system tiles; and, sending, to the LBS server, the respective verification system probability associated with each element of the first set of verification system tiles.

12. The method of claim 10, further comprising, at the location verification system:

receiving, from the LBS server, a first proposed tile level;

determining a second proposed tile level based on the uncertainty associated with the detected location;

determining a confirmed tile level; wherein the confirmed tile level is the maximum of the first proposed tile level and the second proposed tile level; and, sending the confirmed tile level to the LBS server, wherein the first set of verification system tiles is determined based on the confirmed tile level.

13. The method of claim 8, wherein the location verification system is a mobile network operator (MNO) providing mobile network services to the mobile device.

14. The method of claim 8, wherein the private set intersection technique is an RSA-based private set intersection technique.

15. An apparatus for verifying a location of a mobile device at a location-based services (LBS) server, the apparatus comprising:

at least one processor; and at least one memory including computer program code for one or more programs, the at least one memory and the computer program code configured to, with the at least one processor, cause the apparatus to perform at least the following, receive, from the mobile device, a device identifier associated with the mobile device and location information indicating a possible location of the mobile device;

determine a first set of LBS server tiles corresponding to a geographical area associated with the possible location of the mobile device;

send a location verification request to a location verification system, the location verification request comprising the device identifier and causing the location verification system to determine a detected location of the mobile device using network-based positioning; and, verify the possible location by communicating with the location verification system using a private set intersection technique to determine whether at least one element of the first set of LBS server tiles is also an element of a first set of verification system tiles corresponding to a geographical area associated with the detected location of the mobile device, the first set of verification system tiles determined by the location verification system, wherein the first set of LBS server tiles and the first set of verification system tiles are generated using the same tiling scheme and the same tile level.

16. The apparatus of claim 15, wherein verifying the possible location causes the apparatus to:

generate a second set of LBS server tiles by individually obfuscating and encrypting each element of the first set of LBS server tiles using a public key;

send the second set of LBS server tiles to the location verification system;

receive a third set of LBS server tiles and a second set of verification system tiles from the location verification system, wherein the third set of LBS server tiles corresponds to the second set of LBS server tiles in which each element has been individually encrypted using a private key associated with the public key, and wherein the second set of verification system tiles corresponds to the first set of verification system tiles in which each element has been individually encrypted using the private key;

generate a fourth set of LBS server tiles by de-obfuscating each element of the third set of LBS server tiles; and, verify whether the possible location corresponds to the detected location by determining whether at least one element of the fourth set of LBS server tiles is also an element of the second set of verification system tiles.

17. The apparatus of claim 16, wherein the location information comprises an uncertainty associated with the possible location; and wherein the first set of LBS server tiles is determined based on the uncertainty associated with the possible location.

18. An apparatus for verifying a location of a mobile device at a location verification system, the apparatus comprising:

at least one processor; and at least one memory including computer program code for one or more programs, the at least one memory and the computer program code configured to, with the at least one processor, cause the apparatus to perform at least the following, receive, from a location-based services (LBS) server, a location verification request comprising a device identifier associated with the mobile device;

determine a detected location of the mobile device using network-based positioning;

determine a first set of verification system tiles corresponding to a geographical location associated with the detected location of the mobile device; and, communicate with the LBS server using a private set intersection technique in order to determine whether at least one element of the first set of verification system tiles is also an element of a first set of LBS server tiles corresponding to a geographical area associated with a possible location of the mobile device known by the LBS server, wherein the first set of LBS server tiles and the first set of verification system tiles are generated using the same tiling scheme and the same tile level.

19. The apparatus of claim 18, wherein communicating with the LBS server using a private set intersection technique causes the apparatus to:

receive, from the LBS server, a second set of LBS server tiles corresponding to the first set of LBS server tiles in which each element has been individually obfuscated and encrypted using a public key;

generate a third set of LBS server tiles by individually encrypting each element of the second set of LBS server tiles using a private key associated with the public key;

generate a second set of verification system tiles by individually encrypting each element of the first set of verification system tiles using the private key; and, send the third set of LBS server tiles and the second set of verification system tiles to the LBS server for location verification by the LBS server.

20. The apparatus of claim 18, wherein determining the detected location of the mobile device causes the apparatus to determine an uncertainty associated with the detected location, and wherein the first set of verification system tiles is determined based on the uncertainty associated with the detected location.

\* \* \* \* \*